(12) United States Patent
Klumpp et al.

(10) Patent No.: US 8,176,470 B2
(45) Date of Patent: May 8, 2012

(54) COLLABORATIVE DERIVATION OF AN INTERFACE AND PARTIAL IMPLEMENTATION OF PROGRAMMING CODE

(75) Inventors: Martin Klumpp, San Jose, CA (US); Jacques Joseph Labrie, Sunnyvale, CA (US); Mary Ann Roth, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1333 days.

(21) Appl. No.: 11/549,475

(22) Filed: Oct. 13, 2006

(65) Prior Publication Data

US 2008/0091720 A1    Apr. 17, 2008

(51) Int. Cl.
*G06F 9/44* (2006.01)
*G06F 9/45* (2006.01)

(52) U.S. Cl. .................. 717/109; 717/105; 717/159
(58) Field of Classification Search .................. None
See application file for complete search history.

(56) References Cited

U.S. PATENT DOCUMENTS

| | | | |
|---|---|---|---|
| 5,450,545 A * | 9/1995 | Martin et al. | 717/109 |
| 6,438,742 B1 * | 8/2002 | McCann et al. | 717/109 |
| 6,487,713 B1 * | 11/2002 | Cohen et al. | 717/105 |
| 7,533,375 B2 * | 5/2009 | Shibayama et al. | 717/159 |
| 7,716,635 B1 * | 5/2010 | Jeschke | 717/109 |
| 7,765,522 B2 * | 7/2010 | Banavar et al. | 717/109 |
| 7,774,745 B2 * | 8/2010 | Fildebrandt et al. | 717/105 |
| 8,086,995 B2 * | 12/2011 | Luo et al. | 717/109 |
| 2003/0004746 A1 | 1/2003 | Kheirolomoom et al. | |
| 2003/0041314 A1 * | 2/2003 | Heeren et al. | 717/109 |
| 2003/0097286 A1 | 5/2003 | Skeen | |
| 2004/0128001 A1 * | 7/2004 | Levin et al. | 700/31 |
| 2004/0133445 A1 | 7/2004 | Rajan et al. | |
| 2004/0133876 A1 * | 7/2004 | Sproule | 717/105 |
| 2004/0153992 A1 | 8/2004 | Molina-Moreno et al. | |
| 2004/0243971 A1 * | 12/2004 | Leung | 717/104 |
| 2005/0038764 A1 * | 2/2005 | Minsky et al. | 705/1 |
| 2005/0065903 A1 | 3/2005 | Zhang et al. | |
| 2005/0144601 A1 | 6/2005 | Lo | |
| 2005/0256882 A1 | 11/2005 | Able et al. | |
| 2005/0289088 A1 | 12/2005 | Tian et al. | |

(Continued)

OTHER PUBLICATIONS

Ying Zou et al., Workshop on Automatic Service Composition [online], 2009 [retrieved on Dec. 29, 2011], pp. 343-344. Retrieved from the Internet: <URL: http://dl.acm.org/citation.cfm?id=1723097>.*

(Continued)

*Primary Examiner* — Thuy Dao
*Assistant Examiner* — Hanh T Bui
(74) *Attorney, Agent, or Firm* — Patterson & Sheridan, LLP

(57) ABSTRACT

A method, system and computer program product provide an implementation of software. A control flow of a software component is constructed based on a specification model. In various embodiments, the specification model comprises at least one input and at least one requirement referencing the at least one input. At least a partial implementation of the software component is generated based on the control flow and the at least one input and the at least one requirement of the specification model. In some embodiments, the specification model further comprises at least one output, and the at least a partial implementation of the software component is also based on the at least one output.

19 Claims, 18 Drawing Sheets

U.S. PATENT DOCUMENTS

| | | | |
|---|---|---|---|
| 2006/0015848 A1 | 1/2006 | Schwarzmann | |
| 2006/0095892 A1* | 5/2006 | Banavar et al. | 717/109 |
| 2008/0120593 A1* | 5/2008 | Keren et al. | 717/105 |
| 2008/0127052 A1* | 5/2008 | Rostoker | 717/105 |
| 2009/0113387 A1* | 4/2009 | Ziegler | 717/109 |

OTHER PUBLICATIONS

Laszlo Lengyel et al., Model Transformation with a Visual Control Flow Languge [online], Nov. 9, 2005 [retrieved on Dec. 29, 2011], pp. 45-53. Retrieved from the Internet: <URL: http://www.akademik.unsri.ac.id/download/journal/files/waset/v1-1-6-12.pdf>.*

Anand R. Tripathi, Tanvir Ahmed, and Richa Kumar, "Specification of Secure Distributed Collaboration Systems", Proceedings of the Sixth International Symposium on Autonomous Decentralized Systems (ISADS'03), 2003, IEEE. 8 pages.

* cited by examiner

50 ⟶

| Row | Source(s) | Target(s) | Requirement |
|---|---|---|---|
| 1 | Input 1 | Output a<br>Output b | Call existing function F0 |
| 2 | Input 2<br>Input 3 | Output c, ... | F1(F2(Input 2, Input 3)) |
| 3 | Input 4<br>...<br>Input n | Output m | Compute value for Output m by manipulating Inputs 4 through n in the following way ... |

Row 1 } Predefined function
Row 2 } Programming logic
Row 3 } Business rule (textual, description)

Exemplary specification

FIG. 2

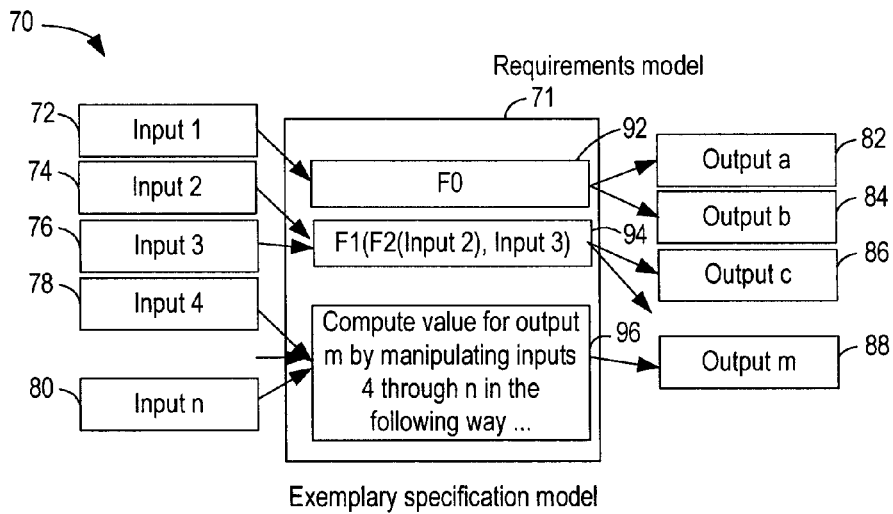

Exemplary specification model

FIG. 3

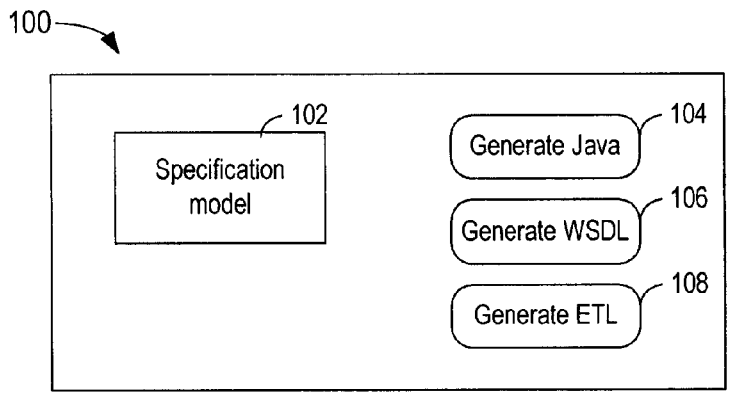

```
(output a, output b, ... output m) Main   ← 162
{
//Generated interface to call specified function of specification row 1
//"Call existing function F0"
    (output a, output b) = call F0(input 1);   ← 164

//Generated interface to call specified function of specification row 2
//"F1(F2(input2)input3)"
    (output c, ...) = call GeneratedCode(input 2, input 3);   ← 166

//Generated interface for code place holder to implement specification row 3
//"business rule text"
    output m = call Input4NToOutputM(input 4, ..., input n);   ← 168
}
```

| Row | Source(s) | Target(s) | Requirement |
|---|---|---|---|
| 1 | Input 1<br>Input 2<br>Input 3 | Output a<br>Output b<br>Output c<br>... | If condition<br>  Row 2<br>Else<br>  Row 3 |
| 2 | Input 1 | Output a<br>Output b | Call existing function F0 |
| 3 | Input 2<br>Input 3 | Output c, ... | F1(F2(Input 2, Input 3)) |
| 4 | Input 4<br>...<br>Input n | Output m | Compute value for Output m by manipulating Inputs 4 through n in the following way ... |

182 ⟶ (points to Row 1)

FIG. 9

```
(output a, output b, ... output m) PartialImplementationFromSpecification
{
  //Predefined function
  if (condition)      ← 202
    (output a, output b) = call F0(input 1);
  else
    (output c, ...) = call GeneratedCode(input 2, input 3);

//Generated interface for code place holder to implement specification row 3
  //"business rule text"
    output m = call Input4NToOutputM(input 4, ..., input n);
}
```

FIG. 10

```
(output c, ...) = GeneratedCode(input 2, input 3);
{
    generated implementation for F1(F2(input 2), input 3);
}
```

FIG. 11

```
(output m) = Input4NToOutputM(input 4, ..., input n);
{
    // Compute the value for output m by manipulating
    // inputs 4 through n in the following way ...
}
```

```
(output c, ...) = GeneratedCode(input 2, input 3);     ← 232
{
    generated implementation for F1(F2(input 2), input 3);
}
                                                        ← 234
(output m) = Input4NToOutputM(input 4, ..., input n);
{
    // Compute the value for output m by manipulating
    // inputs 4 through n in the following way ...
}

(output a, output b, ... output m) Main     ← 236
{
//Generated interface to call specified function of specification row 1
//"Call existing function F0"
    (output a, output b) = call F0(input 1);

//Generated interface to call specified function of specification row 2
//"F1(F2(input2)input3)"
    (output c, ...) = call GeneratedCode(input 2, input 3);

//Generated interface for code place holder to implement specification row 3
//"business rule text"
    output m = call Input4NToOutputM(input 4, ..., input n);
}
```

FIG. 13

| Row | Source(s) | Target(s) | Requirement |
|---|---|---|---|
| 1 | Account, Account_Xact | GroupAccount_Xacts, IndividualAccount_Xacts | If (Account.Type="joint") ←244<br>Rows 3-6<br>Else<br>Rows 7-10 |
| 2 | Account_Xact | | CurrentMonth(Account_Xact.Timestamp) |
| 3 | Account.Id | GroupAccount_Xacts.Account_Id | |
| 4 | Account_Xact.Timestamp | GroupAccount_Xacts.Timestamp | String2Date(Account_Xact.TimeStamp) |
| 5 | Account_Info.Primary_Cust_Name | GroupAccount_Xacts.Primary_Cust_Name Account_Id | Lookup(Key:Account_Info.Account_Id=Account.Id) |
| 5 | Account_Info.Secondary_Cust_Name | GroupAccount_Xacts.Secondary_Cust_Name | |
| 6 | Account_Xact.Value, Account.Id | GroupAccount_Xacts.Sum_Acc_Xact | Compute GroupAccount_Xacts.Sum_Acc_Xact from a running sum of Account_Xact.Value for the account with this ID |
| 7 | Account.Id | IndividualAccount_Xacts.Account_Id | |
| 8 | Account_Xact.Timestamp | IndividualAccount_Xacts.Timestamp | String2Date(Account_Xact.TimeStamp) |
| 9 | Account_Info.Primary_Cust_Name | IndividualAccount_Xacts.Cust_Name | Lookup(Key:Account_Info.Account_Id=Account.Id) |
| 10 | Account_Xact.Value, Account.Id | IndividualAccount_Xacts.Sum_Acc_Xact | Compute IndividualAccount_Xacts.Sum_Acc_Xact from a running sum of Account_Xact.Value for the account with this Id |

FIG. 14

COLLABORATIVE DERIVATION OF AN INTERFACE AND PARTIAL IMPLEMENTATION OF PROGRAMMING CODE

BACKGROUND OF THE INVENTION 1.0 Field of the Invention

This invention relates to a collaborative derivation of an interface; and in particular, this invention relates to collaborative derivation of an interface and partial implementation of programming code.

2.0 Description of the Related Art

Business applications are often created as a collaborative effort between a business analyst and a developer. The business analyst is typically most skilled in defining business rules to describe the information to enable and support business decisions, while the developer is typically skilled in efficient ways to implement computations in programming languages, somewhat independently of the business context in which such computations will be used. This collaboration is often difficult and error prone because the collaborators have different skill sets and they approach the problem from different perspectives and use different tools. A business analyst might use a spreadsheet or a document that is produced using a word processor to define business rules. The business analyst usually expresses those business rules in natural language such as English. The developer may use an Integrated Development Environment (IDE) such as Eclipse or a tool that facilitates programming composition, such as IBM® (Registered Trademark of International Business Machines Corporation) WebSphere® (Registered Trademark of International Business Machines Corporation) DataStage® (Registered Trademark of International Business Machines Corporation), to write computer programs, and define his logic in a programming language, such as Java® (Registered Trademark of Sun Microsystems, Inc.).

Translating the business analyst's business rules to the logic of the developer's programming language is a collaborative and typically mostly manual process today. For example, suppose a business analyst records the following business rule: "take the average credit risk rating per customer over all time periods and all accounts." The developer translates this high level description of the business rule into an interface for a software component that implements the business rule and computes the desired value, and returns that value in the appropriate format. This interface includes a set of inputs (for example, customer id, customer accounts, time periods, risk ratings per time periods), and a set of outputs (for example, the average risk rating). The developer typically implements this interface by writing code which computes the values of the set of outputs based on the values of the set of inputs using the programming language. Typically, to create this interface, the developer reads and discusses the meaning of the business rule with the business analyst, searches for the sources that provide the input values, defines the output values, and defines logical steps that make up the implementation.

This process is slowed down by the difference in skills, language and tools used by the collaborators and the oral communication that may be required to synchronize their understanding. Often times these differences introduce a number of opportunities for misinterpretation and false starts, as information expressed by the business analyst in one language and one tool, for example, English and a spreadsheet, respectively, is manually transformed into the language and tool, for example, Java and Eclipse, respectively, of the developer.

An additional challenge is that a business analyst's business experience and technical skills vary from organization to organization, depending on whether the business analyst's experience is from the business or technical side of the organization. The business analyst's knowledge and understanding may even vary within a particular application. The business analyst may be able to specify exact implementation details to compute some information, and may only be able to describe in words how to compute other implementation information. For example, implementation details for a particular requirement may be well known to a business analyst because a function to perform a computation may already exist from a previous use, such as an arithmetic function such as round( ) or abs( ), or an existing custom function that computes the nearest location to a customer's home address. However, for new requirements, the business analyst may only be able to provide a high level textual description of a requirement, such as "take the average credit risk rating per customer over all time periods and all accounts."

Various conventional technologies provide some level of translation to a technical specification, but tend to focus on the technical user, for example, the developer, and work from technical specifications. For example, some Computer-Aided Software Engineering (CASE) tools and some software modeling tools allow developers to model their applications and generate interfaces in a collaborative environment. The Model-Driven Architecture (MDA) allows a developer to separately model the specification from the implementation on a specific platform. Such CASE tools, software modeling tools and their architectures are aimed at software architects and developers, and focus on the detailed technical specifications for a software application. As a result, such tools typically require a certain level of technical skill to use, for example, knowledge of Unified Modeling Language (UML) diagramming, data structure design and data types. Other tools, such as some graphical editors and some development tools for query building or Extract, Transform and Load (ETL) software development, focus on the user being technically adept in the technology and also typically focus on a single-user.

Therefore, there is a need for an improved technique for automating the collaboration between a business analyst and a developer.

SUMMARY OF THE INVENTION

To overcome the limitations in the prior art described above, and to overcome other limitations that will become apparent upon reading and understanding the present specification, various embodiments of a method, data processing system and computer program product provide an implementation of software. A control flow of a software component is constructed based on a specification model. In various embodiments, the specification model comprises at least one input and at least one requirement referencing the at least one input. At least one partial implementation of the software component is generated based on the control flow and the at least one input and the at least one requirement of the specification model. In some embodiments, the specification model further comprises at least one output, and the at least one partial implementation of the software component is also based on the at least one output.

In various embodiments, a control flow of a software component is constructed based on a specification model. In various embodiments, the specification model comprises at least one input and at least one output. At least one partial implementation of the software component is generated based on the control flow and the at least one input and the at least one output of the specification model. In some embodiments, the specification model further comprises at least one requirement, and the at least one partial implementation of the software component is also based on the at least one requirement.

In this way, an improved technique for automating the collaboration between a business analyst and a developer is provided.

BRIEF DESCRIPTION OF THE DRAWINGS

The teachings of the present invention can be readily understood by considering the following description in conjunction with the accompanying drawings, in which:

FIG. 2 illustrates an exemplary specification that is created by a business analyst that is displayed on a user interface;

FIG. 3 depicts an illustrative specification model that is populated with the content of the exemplary specification of FIG. 2;

FIG. 4 depicts an embodiment of a user interface which allows the user to specify a particular use case;

FIG. 8 depicts an illustrative control flow with interfaces that is generated based on the specification model of FIG. 3;

FIG. 9 depicts an illustrative specification having a conditional requirement based on the exemplary specification of FIG. 2;

FIG. 10 depicts an exemplary control flow that is generated by the generation module based on a specification model based on the illustrative specification of FIG. 9;

FIG. 11 depicts an embodiment of a programming routine that is generated for the requirement of the specification model of FIG. 3 that is associated with row two of the specification of FIG. 2;

FIG. 12 depicts an embodiment of a programming routine that is generated for the requirement of the specification model that is associated with row three of the specification of FIG. 2;

FIG. 13 depicts an embodiment of the exemplary software component that is generated by the generation module based on the specification model of FIG. 3;

FIG. 14 depicts another exemplary specification that will be used to describe an embodiment of the present invention that is used with ETL;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to automate collaboration between a business analyst and a developer. A computer-implemented method, data processing system and computer program product provide an implementation of software. A control flow of a software component is constructed based on a specification model. In various embodiments, the specification model comprises at least one input and at least one requirement referencing the at least one input. At least one partial implementation of the software component is generated based on the control flow and the at least one input and the at least one requirement of the specification model. In some embodiments, the specification model further comprises at least one output, and the at least one partial implementation of the software component is also based on the at least one output.

In various embodiments, a control flow of a software component is constructed based on a specification model. In various embodiments, the specification model comprises at least one input and at least one output. At least one partial implementation of the software component is generated based on the control flow and the at least one input and the at least one output of the specification model. In some embodiments, the specification model further comprises at least one requirement, and the at least one partial implementation of the software component is also based on the at least one requirement.

In various embodiments, a mechanism programmatically interprets the business logic that is expressed in a language and tool familiar to the business analyst to derive an interface and partial implementation for business logic in a language and tool familiar to the developer.

Figure 1:
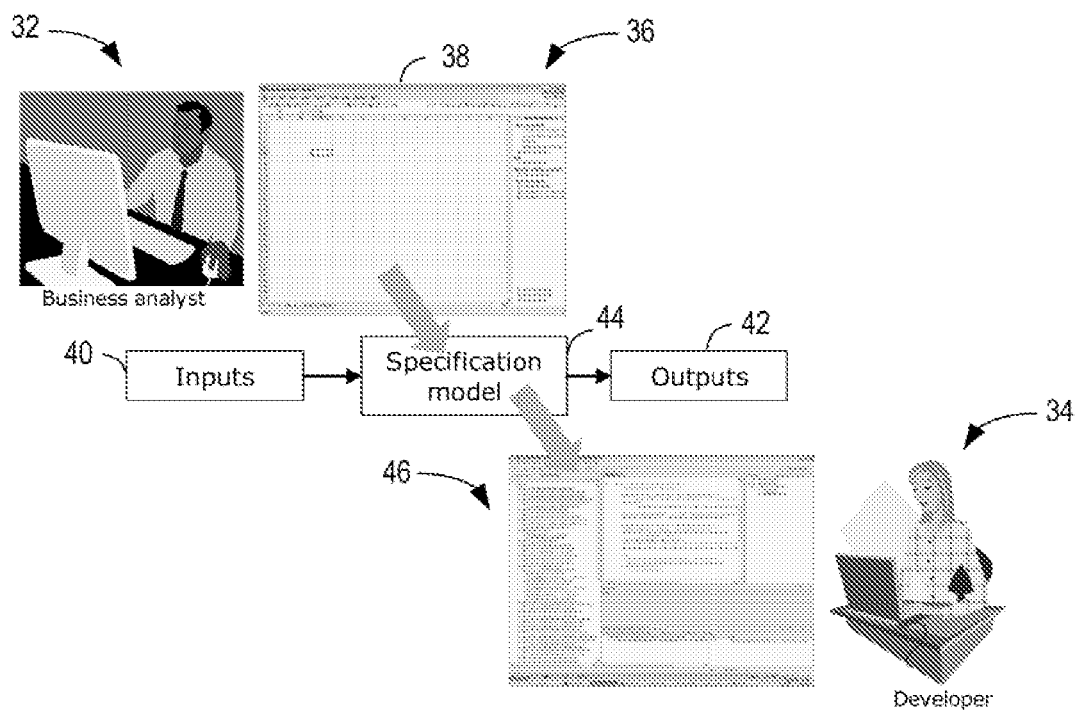
FIG. 1 illustrates an embodiment of automated collaboration between a business analyst and a developer.

FIG. 1 illustrates an embodiment of automated collaboration between a business analyst 32 and a developer 34. A user interface 36 allows the business analyst 32 to provide a specification 38 to select a set of inputs (Inputs) 40 and a set of outputs (Outputs) 42, and define business rules and business logic that produce the set of outputs from the set of inputs. A set of inputs comprises at least one input. A set of outputs comprises at least one output. In various embodiments, there may be different types of rules. Some rules may reference one or more existing programming routines, or existing software components, and other rules, referred to as business rules, are a textual description. The business rules may also be annotated with references to existing programming routines or existing software components that can be used to implement the business rules. The content of this specification 38 is transformed into a specification model 44. An interface is generated based on the specification model 44. In various embodiments, the interface is defined by the set of inputs and the set of outputs. The interface comprises at least a partial implementation comprising the existing programming routines or existing software components referenced in the rules and interface software sub-components that contain respective business rules. The developer 34 can inspect this interface and implementation in the developer's preferred development tool as indicated by user interface 46, and replace the interface software sub-components with newly designed programming routines or, in some embodiments, software sub-components, that implement the respective business rules that are associated with the interface software sub-components.

Various embodiments of the present invention enable a collaborative effort to build a business application between different users with different levels of expertise. It allows business analysts with little or no technical experience to describe information using tools and terminology that they are familiar with. For example, such a user would input the requirements for the business application as a set of loosely-defined business rules describing relationships between information that is available and information to be produced.

A data asset contains data. In various embodiments, a data asset is a data container. In some embodiments, the data asset is structured data, such as a table or a schema of a table of a relational database. In various embodiments, the structured data may be a spreadsheet or a flat file, or in some embodiments a word processing document in which data is organized, or a schema of a WebService. In some embodiments, a data asset is a program variable. In various embodiments, the data asset is unstructured data, such as, in a word processing text document, for example, a letter or report. In some embodiments, the unstructured data may be email, a web page, image data, or audio or video data. A data asset may be used as input and be transformed to produce an output. For example, the input may comprise data assets that are relational data sources such as database tables, and the output may be another data asset such as a database table.

In some embodiments, the invention tracks relationships between requirements, data assets and their corresponding implementations. Various embodiments of the present invention may be used by the business analyst to provide updated information to the developer. As a result, governance may be automated across the collaborative effort, which is increasingly important to comply with new governmental regulations.

FIG. 2 illustrates an exemplary specification 50 that is created by a business analyst and displayed on a user interface. In various embodiments, the specification 50 is displayed on a graphical user interface that is presented on the display of a data processing system. In various embodiments, the user selects inputs and outputs from lists presented in the graphical user interface. The specification 50 has at least one row 52 and at least one column 54, 56, 58 and 60. The columns comprise a row-number column 54, a source (Source(s)) column 56, a target (Target(s)) column 58, and a requirement (Requirement) column 60. At least one input for a requirement is listed in the source column 54, and at least one output is listed in the target column 58. In various embodiments, the user selects a requirement that is a predefined function or programming logic from a plurality of predefined requirements that are presented on a graphical user interface. The user can manually enter a requirement as a business rule. A description of how to compute the output value(s) in the target column from the input value(s) in the source column is listed in the requirement column 60.

In various embodiments, a requirement column of a row, that is a requirement, is empty and the generation module interprets the empty requirement. In some embodiments, if the requirement is empty and if an input and output are specified, the input will be copied to the output. In various embodiments, if the requirement is empty, and if either a plurality of inputs or a plurality of outputs are specified, or if a plurality of inputs and a plurality of outputs are specified, an interface will be created.

In some embodiments, the target column of a row may be empty, that is no output is specified; and the generation module processes the specified source input of the row in accordance with the specified requirement of the row.

Business analysts vary in skill level, from having some programming skills to having no programming skills. Some business analysts may sometimes be able to express various requirements via the actual programming logic, while other business analysts may only be able to provide a textual description of the expected behavior.

The exemplary requirements of FIG. 2 illustrate different levels of detail. For example, the requirement of the first row 52 specifies a predefined function called "F0". The requirement of the second row 62 specifies the actual programming expression that is to be used to compute the output values and this type of requirement is referred to as programming logic. The requirement of the third row 64 specifies a business rule with a high level textual description.

FIG. 3 depicts an illustrative specification model 70 that is populated with the content of the exemplary specification 50 of FIG. 2. In various embodiments, the specification model 70 is displayed on a graphical user interface. In some embodiments, a software module captures the information that is entered by the business analyst in the specification model 70. The specification model 70 is a data structure that stores the requirements 92, 94 and 96, in various embodiments in a requirements model 71, and that relates the requirements 92, 94 and 96 to the inputs 72, 74, 76, 78, and 80 and outputs 82, 84, 86 and 88. Requirements 92, 94 and 96 of the specification model 70 are based on the requirements of row 1, 2, and 3, respectively, of the specification.

In various embodiments, the specification provides a view of the content of the specification model. For example, the specification 50 of FIG. 2 provides a view of the content of the specification model 70 of FIG. 3.

In various embodiments, the specification model is created and updated as the user enters each row. Alternately, the specification model is created after the user completes a specification. In some embodiments, the business analyst creates a specification using a spreadsheet and imports it into the data structure of the specification model.

In various embodiments, a generation module interprets the specification model and incrementally creates corresponding software sub-components of a software component which comprise a partial, and in some embodiments a full, implementation of each requirement in the specification. Whether a full or partial implementation is created depends on the level of detail that is provided in the requirement.

In some embodiments, the generation module has multiple uses, in other words, the generation module may generate one or more software components for a particular use case. For example in one use case, the generation module is used to create software components that provide a linkage between Web Services. In this example, the output schema of WebService A is to be mapped to the input schema of WebService B. The mapping from WebService A into WebService B is defined in a specification. The output schema of WebService A is entered as sources, that is, inputs, in the specification. The input schema of WebService B is entered as targets, that is, outputs, in the specification. Using the specification, a partial, and in some embodiments a full, implementation of the mapping can be derived.

In another example of a use case, the generation module is used to create one or more software components in a specified programming language. For example, the generation module is used to create Java classes that provide an implementation of a specified mapping of the input(s) to the output(s). In this example, the software component is a Java class. In other embodiments, programming languages other than Java may be used.

In yet another example of a use case, the generation module is used to create an ETL Job to transform source data fields into target data fields. One example of an ETL Job is an IBM WebSphere DataStage job. However, in other embodiments, other types of ETL Jobs may be generated. In this use case, the software component is the ETL Job.

In addition, the use cases are not meant to be limited to programming languages, WebServices and ETL Jobs, and various embodiments of the present invention may be used for other use cases.

FIG. 4 depicts an embodiment of a user interface 100 which allows the user to specify a particular use case. The user interface 100 of FIG. 4 has an area for the user to enter the specification model 102, and also has buttons 104, 106 and 108, which, in response to being activated, cause the generation module to generate a software component using Java, WSDL or an ETL job, respectively. Activating a particular button results in the specification model being interpreted for the associated use case.

Figure 5:
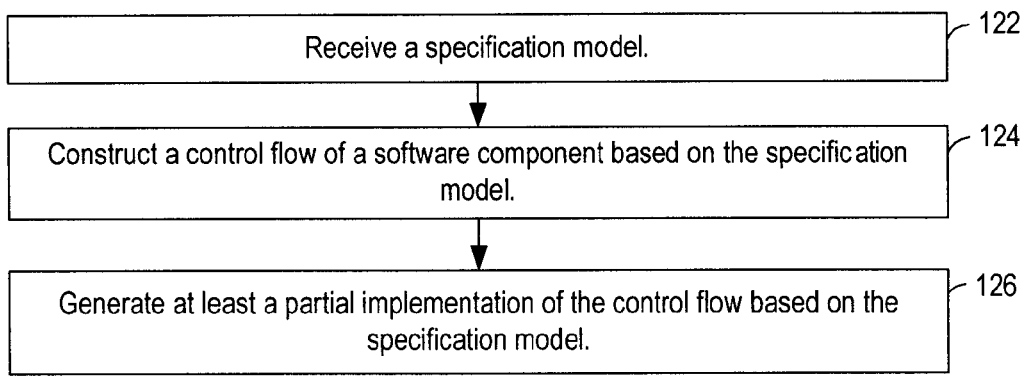
FIG. 5 depicts a flowchart of an embodiment of the processing of the generation module.

FIG. 5 depicts a flowchart of an embodiment of the processing of the generation module. The generation module processes the specification model to derive both the control flow and implementation. In step 122, the generation module receives a specification model.

In step 124, the generation module constructs a control flow of the software component based on the specification model. The generation module determines the "shape" of the software component in terms of the control flow and a set of one or more software sub-components that will make up the software component. In some embodiments, the software component is a program and the software sub-components are programming routines that make up the program. For example, the program is a Java program having a main program comprising calls to invoke functions, and the programming routines are the functions themselves.

In step 126, the generation module generates at least a partial implementation of the control flow based on the specification model. Whether the implementation of a particular requirement is full or partial depends on the particular requirement in the specification model. In some embodiments, the generation module derives at least a partial implementation of that requirement based on the specification model and a specified use case. For example, if a requirement specifies programming logic, a routine that implements that programming logic is added. In another example, if a requirement specifies a business rule, a routine that acts as an interface for that business rule is added.

Figure 6:
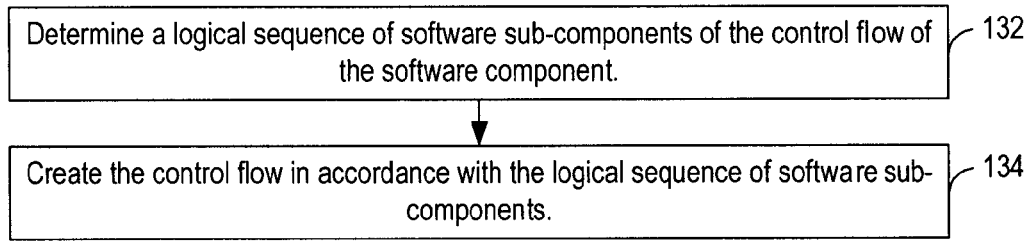
FIG. 6 depicts a flowchart of an embodiment of the step of constructing an initial control flow of FIG. 5.

FIG. 6 depicts a flowchart of an embodiment of step 124 of constructing a control flow of FIG. 5. In step 132, the generation module determines a logical sequence of software sub-components of the control flow of the software component. For example, the generation module creates a "main" program. In various embodiments, the software sub-components are implemented by programming routines. In the absence of dependencies, the generation module orders the calls that invoke the programming routines according to the order introduced by the user in the specification, such as row number order. In addition, the specification model captures implicit dependencies between requirements, and the generation module links the generated implementations for each requirement into a sequence that reflects those dependencies. If the output of one requirement matches the input of another requirement, then the generation module sequences software sub-components such that the implementation of the first requirement is invoked before the implementation of the second requirement. For example, a call to invoke a programming routine that is associated with the first requirement is sequenced to occur prior to a call to invoke a programming routine that is associated with the second requirement.

In various embodiments, more generally, the term "call" refers to an invocation of a software sub-component. The software sub-component may be a programming routine such as a function, method, subroutine, routine or procedure.

In various embodiments, in step 134, the generation module creates the control flow in accordance with the logical sequence of software sub-components. In various embodiments, to create the control flow, the generation module inserts a call to a programming routine into the software component for each requirement in the specification in accordance with the logical sequence. In various embodiments, the call to a programming routine is inserted into the control flow in an order determined by step 132.

Figure 7:
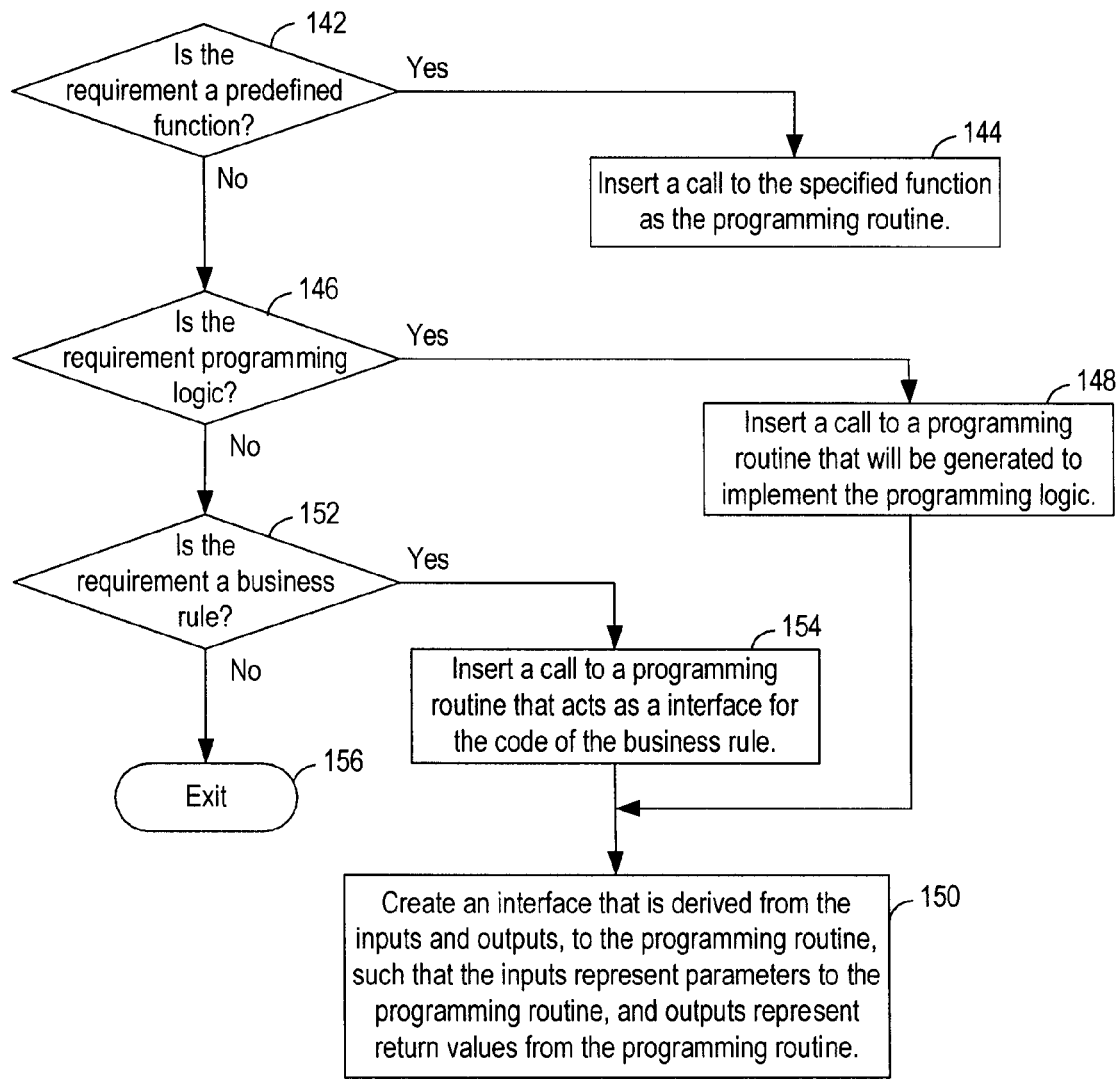
FIG. 7 depicts a more detailed flowchart of an embodiment of creating the control flow of FIG. 6.

FIG. 7 depicts a more detailed flowchart of an embodiment of creating the control flow of step 134 of FIG. 6. In step 142, the generation module determines whether the requirement is a predefined function. In response to step 142 determining that the requirement is a predefined function, in step 144, the generation module inserts a call to the specified function as the programming routine.

In response to step 142 determining that the requirement is not a predefined function, in step 146, the generation module determines whether the requirement is programming logic. In various embodiments, in step 146, an empty requirement is considered to be programming logic if it is associated with exactly one input and exactly one output. In response to step 146 determining that the requirement is programming logic, in step 148, the generation module inserts a call to a programming routine that will be generated to implement the programming logic. In step 150, the generation module creates an interface that is derived from the inputs and outputs, if any, to the programming routine, such that the inputs represent parameters to the programming routine, and outputs represent return values from the programming routine.

In response to step 146 determining that the requirement is not programming logic, in step 152, the generation module determines whether the requirement is a business rule. In various embodiments, in step 152, an empty requirement is considered to be a business rule if it is associated with a plurality of inputs and/or a plurality of outputs. In response to step 152 determining that the requirement is a business rule, in step 154, the generation module inserts a call to a programming routine that is acts as an interface for the code of the business rule. Step 154 proceeds to step 150 to create an interface.

In response to step 152 determining that the requirement is not a business rule, in step 156, the flowchart exits.

FIG. 8 depicts an illustrative control flow 160 with interfaces generated based on the specification model of FIG. 3. In various embodiments, the control flow is presented to the user in a user interface on a display. The order in which the requirements are specified refers to the row order, that is, the row number of a requirement. For example, the call 164 to the predefined function of the requirement of row one is first, followed by the call 166 to a programming routine that is associated with the requirement of row two, followed by the call 168 to the programming routine that is associated with the requirement of row three. Because there are no implicit dependencies in the specification model of FIG. 3, the sequence order of the calls matches the order in which the requirements are specified in the specification, that is, the row number order.

In FIG. 8, the first line 162 declares the "Main" program and lists the outputs which are returned. Line 164 is generated in response to requirement 92 (FIG. 3) of the specification model, and therefore row one of the specification. Line 164 calls the predefined function "F0" with "input 1" as an argument, and returns "output a" and "output b".

Line 166 is generated in response to requirement 94 (FIG. 3) of the specification model, and therefore row two of the specification. Because the requirement 94 is programming logic, the generation module creates a distinct function name, in this example "GeneratedCode" and adds a call to that function to the "Main" program. The generation module also includes the arguments and return values of the call. For example, line 166 calls the function "GeneratedCode" with "input 2" and "input 3" as arguments, and returns "output c, . . . ".

Line 168 is generated in response to requirement 96 (FIG. 3) of the specification model, and therefore row three of the specification. The requirement of row three is a business rule. The generation module creates a distinct function name, in this example "Input4NToOutputM" and adds a call to that function to the "Main" program. The generation module also includes the arguments and return values of the call. In this example, line 168 calls the function "Input4NToOutputM", with "input 4" to "input n" as arguments, and returns "output m". The generated function call acts as an interface for a programming routine to implement the business rule as described by the text of the requirement.

In some embodiments, the user also has an option to manually relate a plurality of requirements into a desired sequence in the specification model.

In various embodiments, the user can create a conditional requirement. For example, suppose that the user would like to insert a condition in the exemplary specification of FIG. 2 such that if the condition is true, row two is executed, and if the condition is false, row three is executed. Using the user interface, the user can define a conditional requirement which is captured in the specification model and for which, in some embodiments, code is generated.

FIG. 9 depicts an illustrative specification 180 having the conditional requirement described above based on the exemplary specification of FIG. 2. The conditional requirement is inserted in new row one 182 of the specification. In row one 182, the inputs and outputs of rows two and three are specified in addition to the conditional requirement which specifies rows two and three. The conditional requirement of row one 182 is: "If condition Row 2 Else Row 3".

FIG. 10 depicts an exemplary control flow that is generated by the generation module based on a specification model based on the illustrative specification of FIG. 9. The generation module generates a control flow of a software component called "PartialImplementationFromSpecification". In response to the conditional requirement of the specification model that is associated with row one of FIG. 9, the generation module generates the code 202 of FIG. 10 and as indicated below:

```
"if (condition)
    (output a, output b) = call F0(input 1);
else
    (output c, ...) = call GeneratedCode(input 2, input 3);"
```

Referring back to step 126 of FIG. 5, a more detailed embodiment of generating at least a partial implementation of the control flow based on the specification model will now be described. For example, referring also to FIGS. 2 and 3, because the requirement of the specification model that is associated with row one specifies a pre-defined function, the generation module performs no further implementation of the requirement that is associated with row one. For the requirement of row one, the programming routine is the predefined function.

FIG. 11 depicts an embodiment of a programming routine 210 that is generated for the requirement of the specification model of FIG. 3 that is associated with row two of the specification of FIG. 2. The generation module already generated a call to a programming routine associated with this requirement, in this example, "GeneratedCode". In the requirement of specification model of FIG. 3 that is associated row two of the specification of FIG. 2, the requirement contains a complete implementation of a code fragment. The code fragment is expressed in a programming language. The generation module generates a programming routine called "GeneratedCode" that uses the source column associated with the requirement as input, the target column associated with the requirement as output, and embeds the code fragment in the body of the programming routine. In this example, the programming routine is a function.

FIG. 12 depicts an embodiment of a programming routine 220 that is generated for the requirement of the specification model that is associated with row three of the specification of FIG. 2. This requirement is a business rule. The generation module previously generated a call to the programming routine 220 associated with this requirement, in this example, "Input4NToOutputM". In this example, the generation module can only provide a partial implementation of the programming routine for requirement of specification model associated with the third row of the specification of FIG. 2. This partial implementation of the programming routine is shown in FIG. 12. The programming routine 220 comprises an interface and function body, with embedded comments that capture the text of the associated business rule. This partial implementation provides a guide to the developer by defining the inputs and outputs for the software sub-component, and describing the logic that is to be implemented to satisfy the requirement. Programming routine 220 is also referred to as an interface software sub-component because the inputs and outputs are defined.

In various embodiments, if an empty requirement is associated with exactly one input and exactly one output, in step 126 of FIG. 5, the generation module generates code that performs an assignment operation to set the output equal to the input in the programming routine. For example, for an input that is a column of a source data asset and an output that is a column of a target data asset, the assignment operation may set the value of the target column of the target data asset equal to the value of the column of the source data asset.

In some embodiments, if an empty requirement is associated with a plurality of inputs and/or a plurality of outputs, in step 126 of FIG. 5, the generation module treats the empty requirement as a business rule.

FIG. 13 depicts an embodiment of the exemplary software component 230 that is generated by the generation module based on the specification model of FIG. 3. In this example, the software component 230 is a program comprising code. The code associated with the programming routines that are generated for rows 2 and 3, 232 and 234, respectively, is illustrated, as well as code of the "Main" routine 236 that defines the control flow sequence for the complete specification model of FIG. 3.

FIG. 14 depicts another exemplary specification 240 which will be used to describe an embodiment of the present invention that is used with ETL. For example, IBM WebSphere DataStage is an ETL tool that is part of IBM WebSphere® Data Integration Suite. IBM WebSphere DataStage enables a user to integrate enterprise information, regardless of the sources, targets and timeframes. Various embodiments will be described with respect to an IBM WebSphere DataStage job. However, the invention is not meant to be limited to IBM WebSphere DataStage and may be used with graphical development tools.

In various embodiments, a "program" is referred to as a job, and a job is typically constructed graphically on a "canvas" of a graphical user interface. The canvas may contain a combination of set-based and column-based operations that move and transform data from a set of sources into a set of targets. Set-based operations are called operators, and represent such operations as joins, filters, and aggregation. Operators are linked together via lines, which indicate data flows from one operator to another. Set-based operations may also be referred to as data asset-based operations. Column-based operations are functions, and comprise pre-defined and user-defined functions such as StringToDate( ), or Current Month( ). In various embodiments, column-based operations are also associated with operators.

This exemplary scenario involves two sources that represent transactional and account data. The Account_Xact data asset contains daily transactions for an account. The Account data asset contains the account information including the account Id and whether the account is held as an individual account or a joint account. A lookup data asset is available to return additional account holder information such as name and address. The Account and the Account_Xact data assets will be aggregated into two target data assets: GroupAccount_Xacts, which contains an aggregation of the transactions per account for the current month for joint accounts, and IndividualAccount_Xacts, which contains an aggregation of the transactions per account for the current month for individual accounts. The Account_Xact.Timestamp column is used to identify the month's transactions, and the Account.Type column is used to identify whether an account is held jointly or by an individual.

In the specification of FIG. 14, row 1 242 has a requirement 244 comprising a condition by which data is moved either to the GroupAccount_Xacts data asset or to the IndividualAccounts_Xact data asset. The requirement 244 of row 1 242 conditionally tests Account.Type. If the value of Account.Type is "joint" then the specification indicates that rows 3-6 are valid. If the value of Account.Type is not "joint" the specification indicates that rows 7-10 are valid.

Row 2 246 defines a condition to extract only the data of the current month from the source data asset Account_Xact. A predefined function called "CurrentMonth" takes "Account_Xact.Timestamp" as an argument and returns true if the timestamp is in the current month, and false otherwise.

Rows 3, 4, 5 and 6, 248, 250, 252 and 254, respectively, describe requirements to move the source data to the GroupAccount_Xacts data asset. Row 3 248 describes moving, and in various embodiments storing, the value of the column "Id" of the "Account" data asset into the column GroupAccount_Xacts.Account_Id. The requirement field is blank indicating that the value of the "Id" column of the Account data asset is moved from the source to, in various embodiments is stored in, the target Account_Id column of the GroupAccount_Xacts data asset without any additional transformation.

Row 4 250 describes transforming the string value from Account_Xact.Timestamp to a date value of the target column GroupAccount_Xacts.Timestamp by calling the String2Date function. This is expressed using the predefined function (StringToDate) which is embedded in an expression.

Row 5 252 describes a lookup operation. In various embodiments, the lookup function is considered to be a programming logic requirement. The lookup data asset (Account_Info) represents the source of the lookup operation and contains detailed account information. To obtain the names for the primary and secondary account holder from the lookup data asset Account_Info, it is joined with the Account data asset. The join (Account_Info.Account_Id=Account.Id) is defined by the key element in the lookup function. The columns Account_Info.Primary_Cust_Name and Account_Info.Secondary_Cust_Name are mapped into the GroupAccount_Xacts data asset columns Primary_Cust_Name and Secondary_Cust_Name, respectively.

Row 6 254 defines a requirement to compute a running sum over the column Account_Xact.Value for each account Id given by Account.Id. This requirement is a business rule comprising a textual description rather than programming logic or a predefined function.

Rows 7, 8, 9 and 10, 256, 258, 260 and 262, respectively, have requirements that describe moving the source data to the IndividualAccount_Xacts data asset. The IndividualAccount_Xacts data asset differs from the GroupAccount_Xacts data asset in that it has a single column Cust_Name, rather than Primary_Cust_Name and Secondary_Cust_Name. As a result, the requirements of rows 7, 8, 9 and 10 are similar to those described above, with the exception that the lookup data asset is called to return the primary customer's name.

Figure 15A:
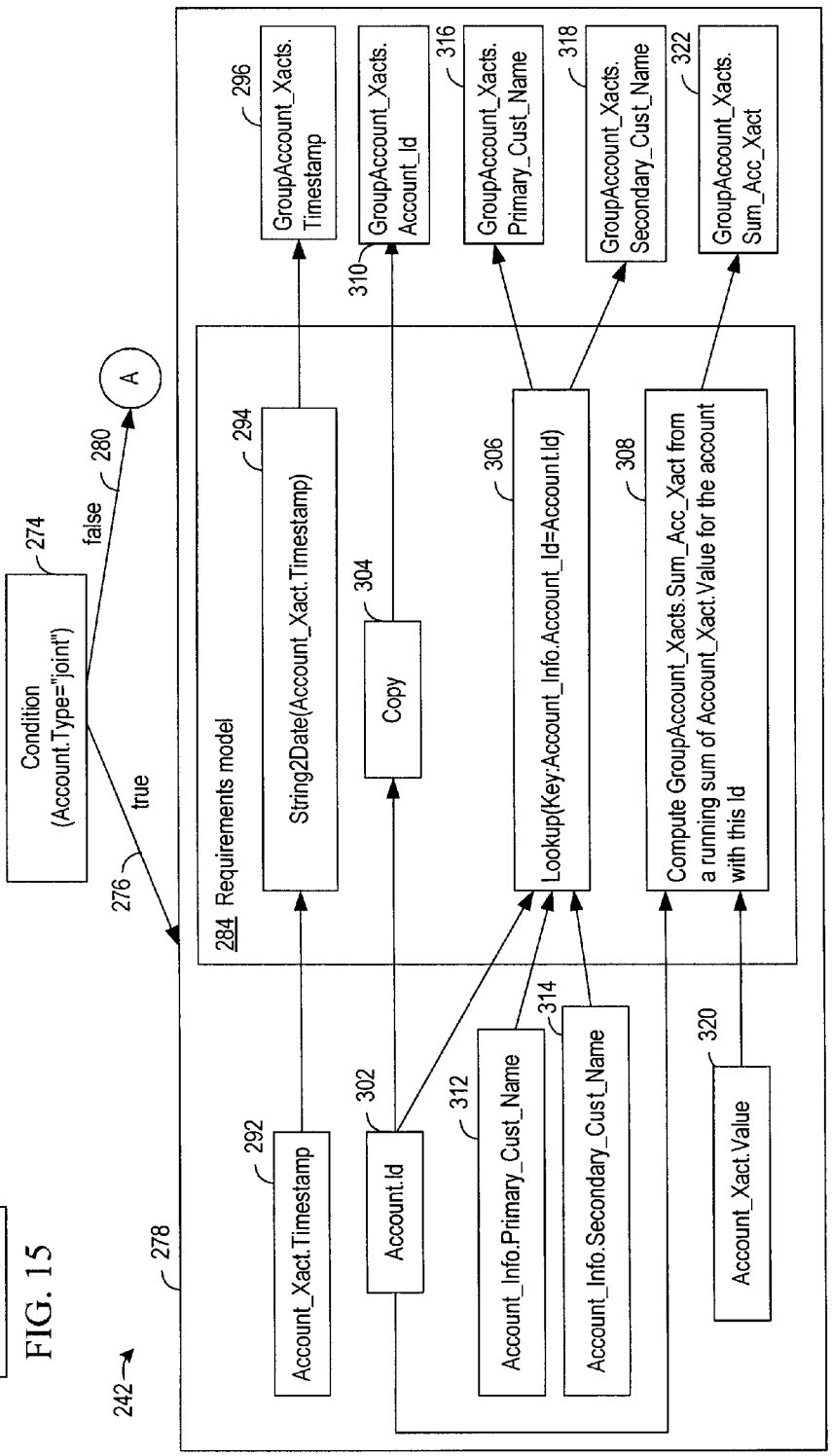
FIG. 15 comprises FIGS. 15A and 15B which collectively depict an exemplary specification model that is populated with the content of the exemplary specification of FIG. 14.
Figure 15B:
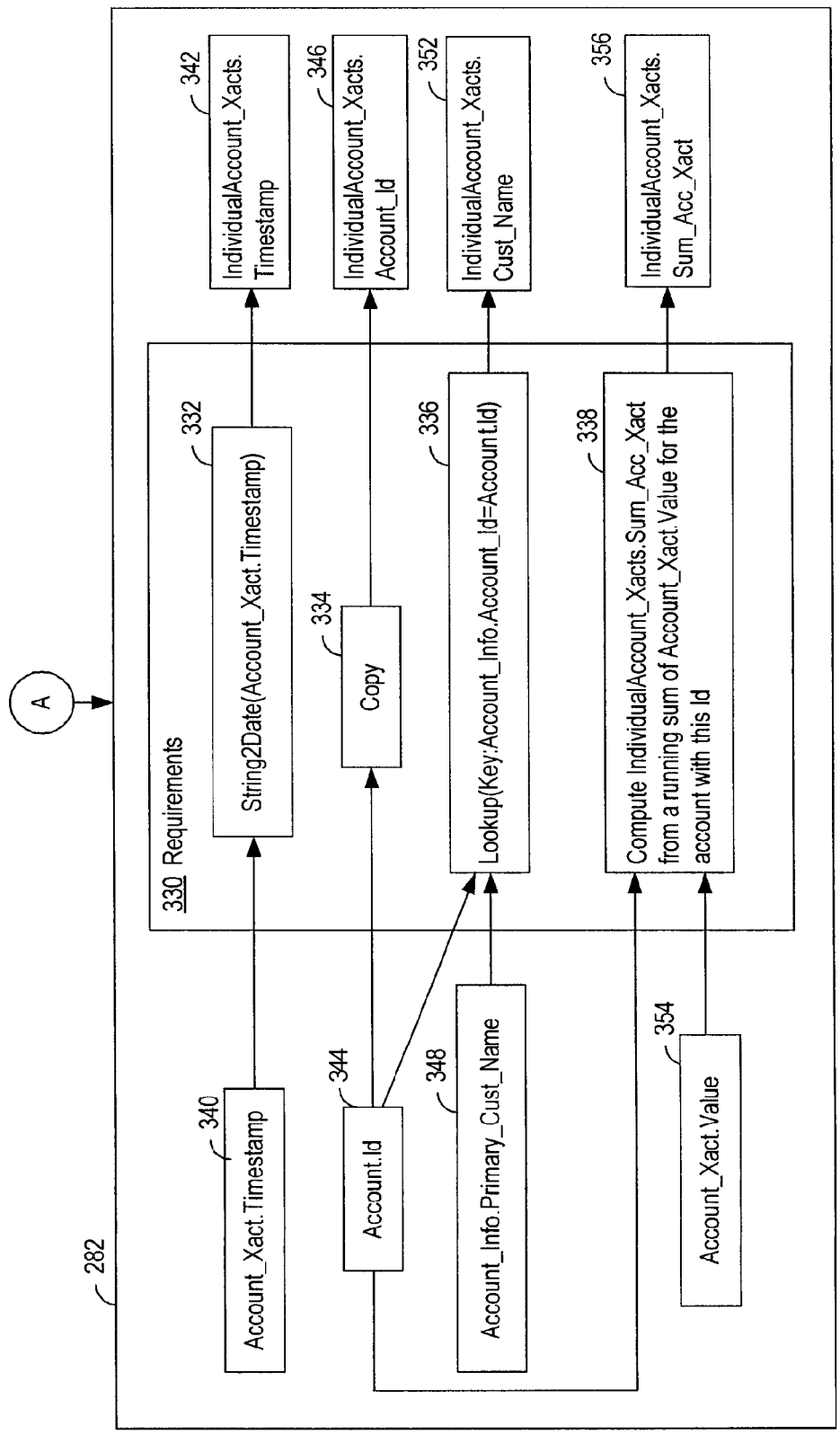

FIG. 15 comprises FIGS. 15A and 15B which collectively depict an exemplary specification model 270 that is populated with the content of the exemplary specification 240 of FIG. 14. The exemplary specification model 270 comprises descriptions of the inputs and outputs, that is sources and targets, which in this example, are source and target database schema models, respectively, and a requirements model that associates the source and target database schema models using the requirements of the specification that reference the source and target database schema models.

In the specification model 270, the requirement of row 2 246 of FIG. 14 is mapped to element 272. Row 2 246 of FIG. 14 does not have a target because it represents a filter and is applied on the defined input in the source column. For example, the requirement "CurrentMonth(Account_Xact.Timestamp)" of row 2 246 of FIG. 14 results in the data from the current month to be provided as the input when Account_Xact is specified as an input in other rows of the specification. Therefore, element 272 contains a conditional requirement. The data from a previous month will not be provided. In some embodiments, the requirement "Current- Month(Account_Xact.Timestamp)" of element 272 is used to generate a predicate to a query of a database that contains the Account_Xact data asset.

The conditional requirement 244 of row 1 242 is mapped to element 274 of the specification model. If the condition of element 274 evaluates to true, as indicated by arrow 276, element 274 proceeds to element 278. Element 278 implements rows 3-6 of the specification of FIG. 14. If the condition of element 274 evaluates to false, as indicated by arrow 280, element 274 proceeds via Continuator A to element 282 of FIG. 15B.

Element 278 comprises a requirements model 284. Each input and output to be mapped is referenced by its associated requirement(s). For example, requirement "String2Date" references Account_Xact.Timestamp. The input called Account_Xact.Timestamp 292 is mapped by requirement 294 to the output called GroupAccount_Xacts.Timestamp 296.

In the exemplary specification of FIG. 14, the input, a column called Account.Id 302, is referenced by multiple requirements 304, 306 and 308. Therefore multiple references, that is arrows, are shown from Account.Id 302 to requirements 304, 306 and 308.

Requirement 304 moves data from Account.Id 302 to the GroupAccount_Xacts data asset 310.

Requirement 306 receives as inputs Account.Id 302, Account_Info.Primary_Cust_Name 312, and Account_Info. Secondary_Cust_Name 314, performs a lookup based on the lookup key and moves data to the outputs GroupAccount_Xacts.Primary_Cust_Name 316 and GroupAccount_Xacts. Secondary_Cust_Name 318. In this example, the requirement 306 specifies a lookup key of "Account_Info.Account_Id=Account.Id" which causes the Account_Info data asset to be searched for data based on the specified Account.Id 302.

Requirement 308 receives Account.Id 302 and Account_Xact.Value 320, computes GroupAccount_Xacts.Sum_Acc_Xact 322 from a running sum of Account_Xact.Value for the account with this Id.

In FIG. 15B, element 282 comprises a requirements model 330 comprising requirements 332, 334, 336 and 338. Requirement 332 applies "String2Date" to input Account_Xact.Timestamp 340 and stores the result in IndividualAccount_Xacts.Timestamp 342.

Requirement 334 copies the value in Account.Id 344 to IndividualAccount_Xacts.Account_Id 346.

Inputs Account.Id 344, Account_Info.Primary_Cust_Name 348 are provided to requirement 336 which performs a lookup and outputs IndividualAccount_Xacts.Cust_Name 352.

Inputs Account.Id 344 and Account_Xact.Value 354 are provided to requirement 338. Requirement 338 computes IndividualAccount_Xacts.Sum_Acc_Xact 356 from a running sum of Account_Xact.Value for each account id.

Figure 16:
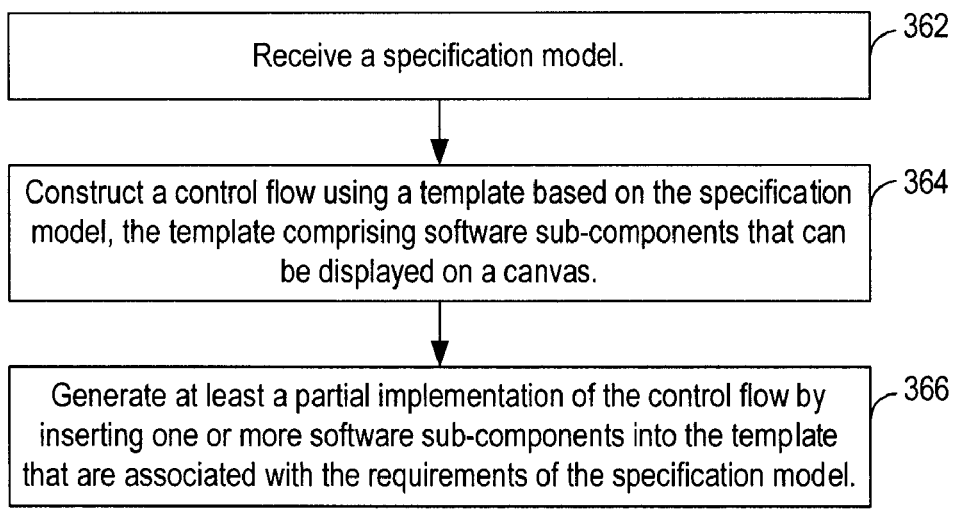
FIG. 16 depicts a flowchart of an embodiment of processing a specification model to derive a structure of a template.

FIG. 16 depicts a flowchart of an embodiment of processing a specification model to derive a structure of a template. The template represents a software component. In various embodiments, the generation module processes the specification model to derive a structure of the template that can satisfy the requirements.

In step 362, the generation module receives a specification model.

In step 364, the generation module constructs a control flow using a template based on the specification model. The template comprises software sub-components that can be displayed on a canvas. The generation module determines a general "shape" of the template by identifying all data sources and targets, their relationships to each other (such as join or merge conditions), and set level operations, such as conditional elements that are applied on the data asset level. The generation module inserts software sub-components that represent the data sources, targets, their relationship, and set level operations into the template. For example, in various embodiments, the software sub-components are operators. The generation module also indicates the flow between the software sub-components by linking the software sub-components. In various embodiments, the generation module also determines a logical sequence of software sub-components of the control flow as described above with reference to FIG. 6.

In step 366, the generation module generates at least a partial implementation of the control flow by inserting one or more software sub-components into the template that are associated with the requirements of the specification model.

Figure 17:
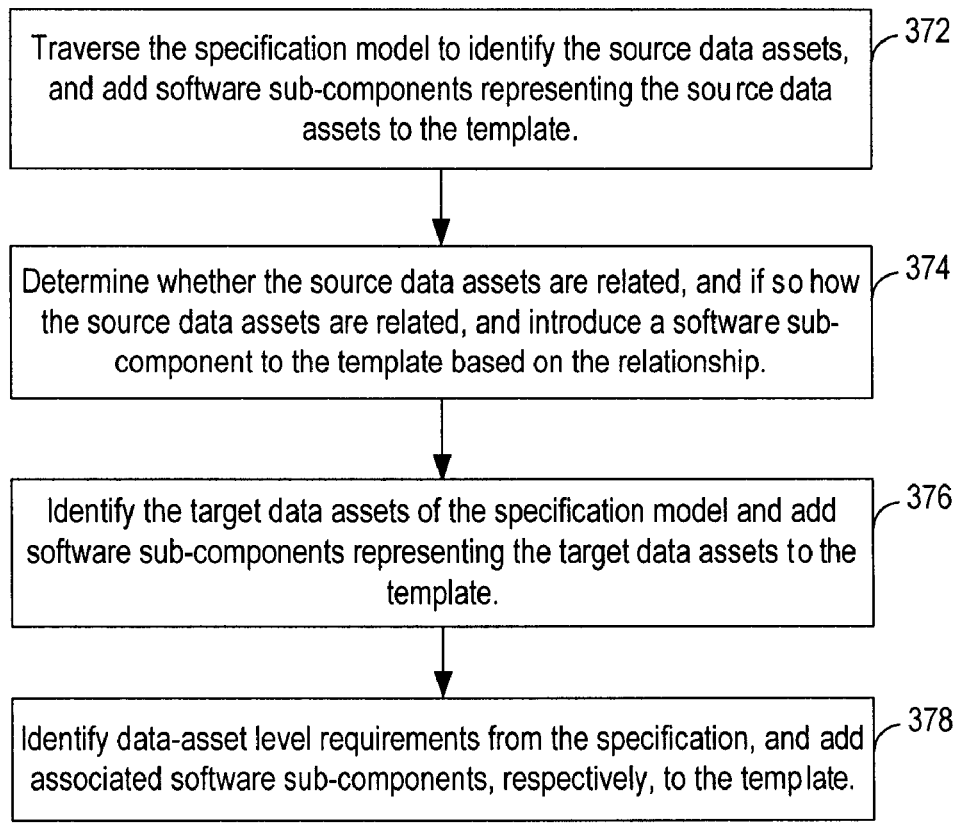
FIG. 17 depicts a flowchart of an embodiment of the step of constructing a template of software sub-components of FIG. 16.

FIG. 17 depicts a flowchart of an embodiment of constructing a template of software sub-components of step 364 of FIG. 16. In various embodiments, the template is displayed on a canvas. In step 372, the generation module traverses the specification model to identify the source data assets, and add software sub-components representing the source data assets to the template.

In step 374, the generation module determines whether the source data assets are related, and if so how the source data assets are related, and introduces a software sub-component to the template based on the relationship.

In step 376, the generation module identifies the target data assets of the specification model and adds software sub-components representing the target data assets to the template.

In step 378, the generation module identifies data asset level requirements from the specification, and adds associated software sub-components, respectively, to the template.

Figure 18:
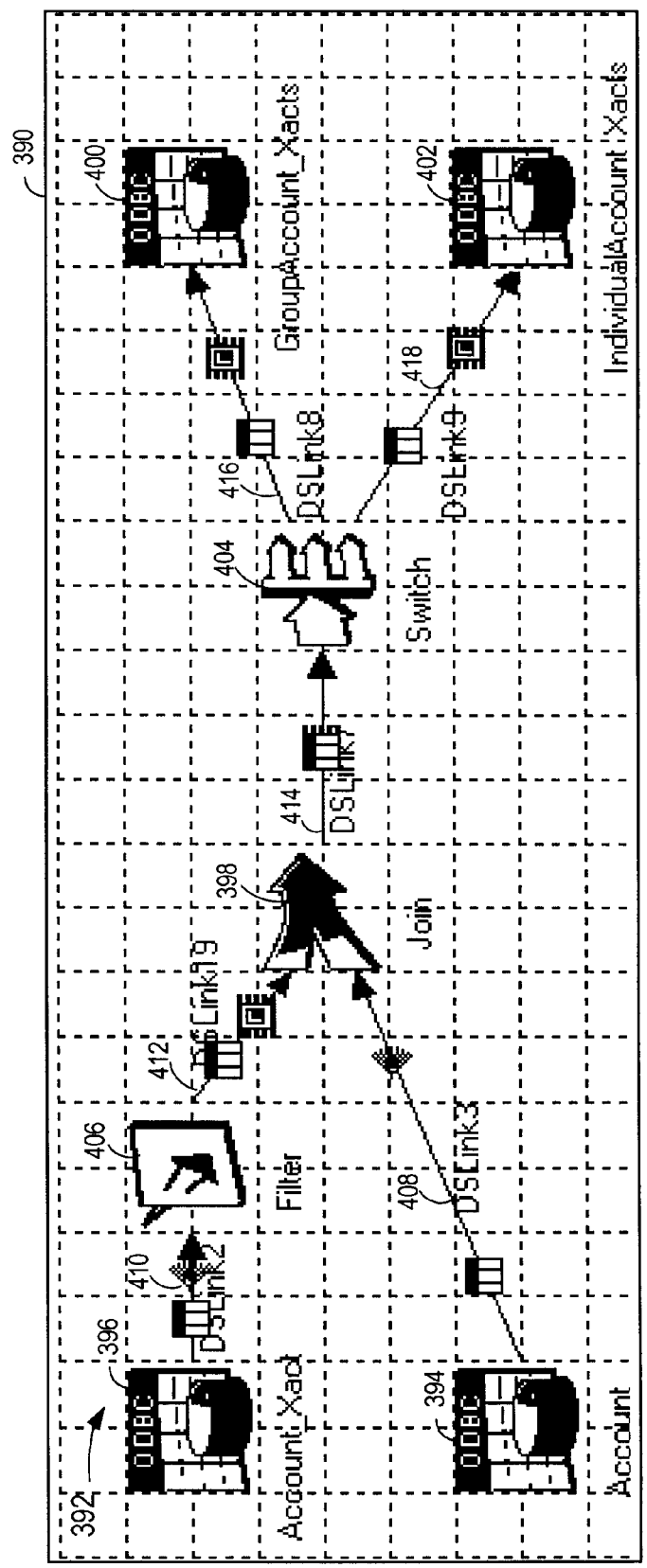
FIG. 18 depicts a canvas of a graphical user interface that is displaying an exemplary ETL job that is constructed after the flowchart of FIG. 17 is performed based on the specification model of FIG. 15.

FIG. 18 depicts a canvas 390 of a graphical user interface that is displaying an exemplary ETL job 392 that is constructed after the flowchart of FIG. 17 is performed, based on the specification model of FIG. 15. In this embodiment, the template is an ETL job, and the software sub-components comprise ETL operators. In other embodiments, the template is a software component other than an ETL job. For example, in step 372 of FIG. 17, the specification model of FIG. 15 is traversed to identify the source data assets, Account and Account_Xact. The generation module traverses the schemas for these two data assets and discovers that they reside in different databases. As a result the generation module adds two Object DataBase Connectivity (ODBC) data source ETL operators 394 and 396 representing the schemas of Account and Account_Xact, respectively, to ETL job.

Continuing the example, in step 374 of FIG. 17, the generation module determines whether the source data assets Account and Account_Xacts are related, and if so how the source data assets are related, and introduces an ETL operator to the ETL job based on the relationship. Since no merge condition, such as a join, exists in the specification model of FIG. 15, the generation module traverses the schemas for the two data assets, and finds that they share a primary key/foreign key relationship over the common column Id. In various embodiments, the generation module invokes a discovery module to determine whether the data assets share any relationships. Based on this relationship, the generation module introduces a join ETL operator 398 into the ETL job, with a condition of Account.Id=Account_Xact.Id.

More generally, the join ETL operator represents a relationship of a plurality of sources, that is "n" sources, to one target.

For example, in step 376 of FIG. 17, the generation module identifies the target data assets GroupAccount_Xacts and IndividualAccount_Xacts of the specification model of FIG. 15 and adds ODBC data source ETL operators 400 and 402 representing the GroupAccount_Xacts and IndividualAccount_Xacts target data assets, respectively, to the ETL job.

In step 378 of FIG. 17, the generation module identifies data asset level requirements from the specification model, and adds associated ETL operators, respectively, to the ETL job. In this example, rows 1 and 2 of the specification FIG. 14 are data asset-level requirements; and rows 3-10 of FIG. 14 are column-level requirements. Row 1 relates two target data assets, GroupAccount_Xacts and IndividualAccount_Xacts, by means of a "switch" condition, that is, the "If" statement. The specification model therefore comprises the switch condition in the requirements. In response to the switch condition, the generation module adds a switch ETL operator 404 to the ETL job, with each of the target data assets as outputs of the ETL operator as shown in FIG. 18. More generally, a switch ETL operator represents a relationship of a single source to a plurality of targets, that is "n" targets. The explicit conditional element of row 2 of the specification is contained in the requirements of the specification model. In response to the filter condition, the generation module adds a filter ETL operator 406 to the ETL job. Because the filter condition involves the source data asset Account_Xact, the generation module places the filter ETL operator 406 after the Account_Xact source 396 to only allow records from the current month to flow to the rest of the ETL job.

A link comprises the column(s) that are moved between ETL operators. The link comprises the column(s) that are defined by the specification model as input(s) to a requirement. The requirement defines the operation that is executed at the ETL operator. The output of the ETL operator is a new set of one or more columns that are provided on the outgoing link to the next ETL operator. Therefore, the links show the flow between operators. In FIG. 18, a link, called DSLink3 408, is shown from the Account source data asset 394 to the join ETL operator 398. As the ETL job is constructed for example in step 372, a link, for example DSLink2, is also placed between the Account_Xact source data asset and the join ETL operator 398. In response to the filter ETL operator 406 being added in step 378, the link, DSLink2 410 is updated to indicate a flow from the Account_Xact 396 source data asset to the filter ETL operator 406 and DSLink19 412 is added from the filter ETL operator 406 to the join ETL operator 398. Also in step 378, DSLink7 414 added from the join ETL operator 398 to the switch ETL operator 404. DSLink8 416 and DSLink9 418 are placed from switch ETL operator 404 to GroupAccount_Xacts 400 and IndividualAccountXacts 402, respectively. In various embodiments, the link is a DataStage link; however, the invention is not meant to be limited to DataStage links and other links may be used.

The processing of step 366 of FIG. 16 of generating at least a partial implementation of the control flow will now be described in further detail. In various embodiments, in step 364 the generation module configures the ETL job that is created in step 362 of FIG. 16. In various embodiments, the types of requirements comprise predefined function, programming logic, and business rule. In step 364 of FIG. 16, the generation module processes each type of requirement differently.

Figure 19:
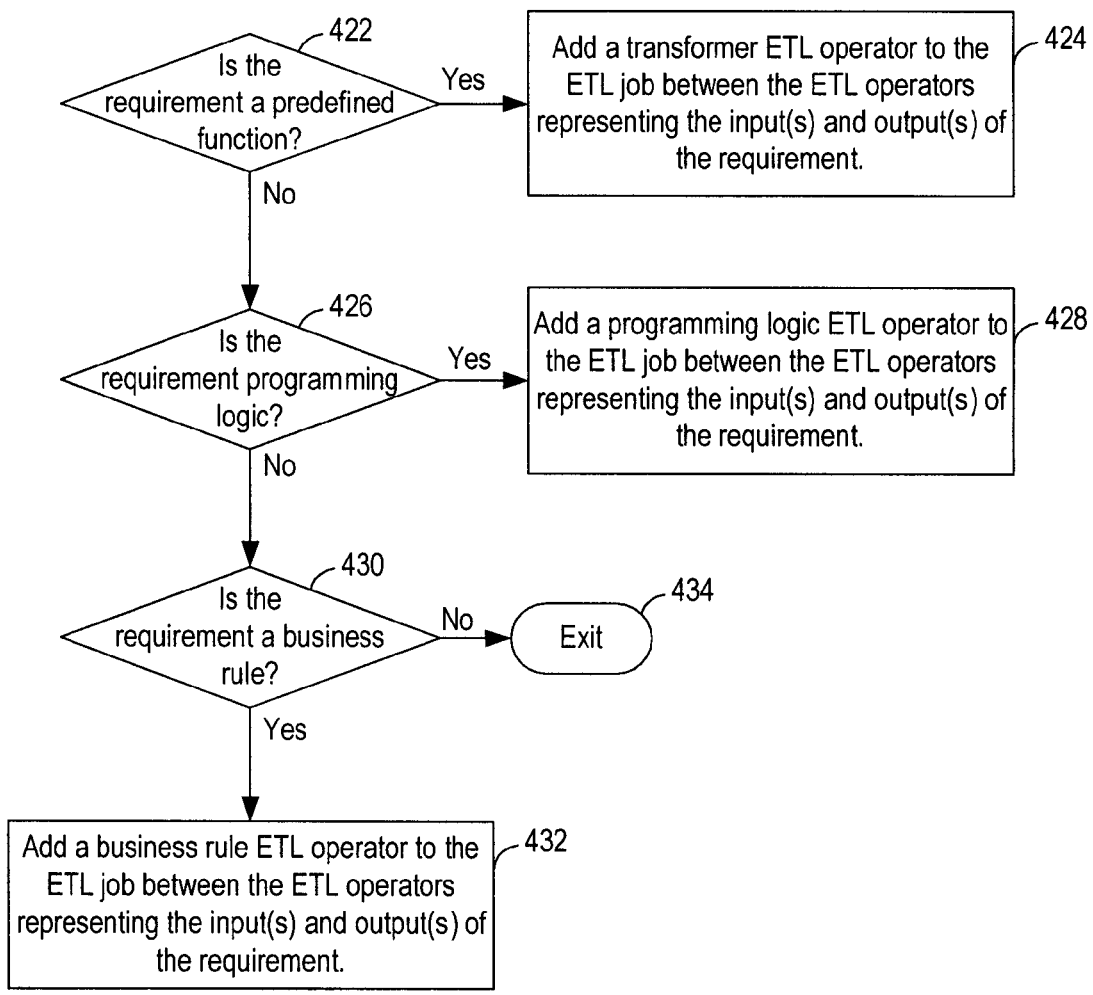
FIG. 19 depicts a flowchart of an embodiment of at least a portion of the step of generating at least a partial implementation of the control flow of FIG. 16.

FIG. 19 depicts a flowchart of an embodiment of at least a portion of generating at least a partial implementation of the control flow of step 366 of FIG. 16 for an ETL job. In step 422, the generation module determines whether a requirement is a predefined function. If so, in step 424, the generation module adds a transformer ETL operator to the ETL job between ETL operators representing the input(s) and output(s) of the requirement. The transformer ETL operator is a software sub-component of the ETL job.

If in step 422 the generation module determines that the requirement is not a predefined function, in step 426, the generation module determines whether the requirement is programming logic. In various embodiments, in step 426, an empty requirement is considered to be programming logic if the requirement is associated with exactly one input and exactly one output. If so, in step 428, the generation module adds a programming logic ETL operator to the ETL job between the ETL operators representing the input(s) and output(s) of the requirement. The programming logic ETL operator is a sub-component of the job.

If in step 426 the generation module determines that the requirement is not programming logic, in step 430, the generation module determines whether the requirement is a business rule. In various embodiments, in step 430, an empty requirement is considered to be a business rule if the requirement is associated with a plurality of inputs and/or a plurality of outputs. If so, in step 432, the generation module adds a business rule ETL operator to the ETL job between the ETL operators representing the input(s) and output(s) of the requirement. The business rule ETL operator is an interface software sub-component because its inputs and outputs are defined. The business rule ETL operator acts as an interface ETL operator for the business rule. If in step 430, the generation module determines that the requirement is not a business rule, in step 434 the flowchart exits.

In some embodiments, a predefined function can either be a scalar function that operates on columns, or an operator that operates on sets of rows. Rows 4 and 8 of the specification of FIG. 14 have requirements which are scalar functions. Programming logic requirements are expressed as a set of more complex expressions that can be directly translated into ETL operators and functions. Rows 5 and 9 of the specification of FIG. 14 have exemplary programming logic requirements such as the lookup function which can be directly translated into a lookup operator. Row 6 of the specification of FIG. 14 has a requirement that is expressed as a textual business rule.

Rows 3 and 7 of FIG. 14 copy data from source to target, and are implicitly handled by the flow of data between ETL operators using the connecting links.

Figure 20:
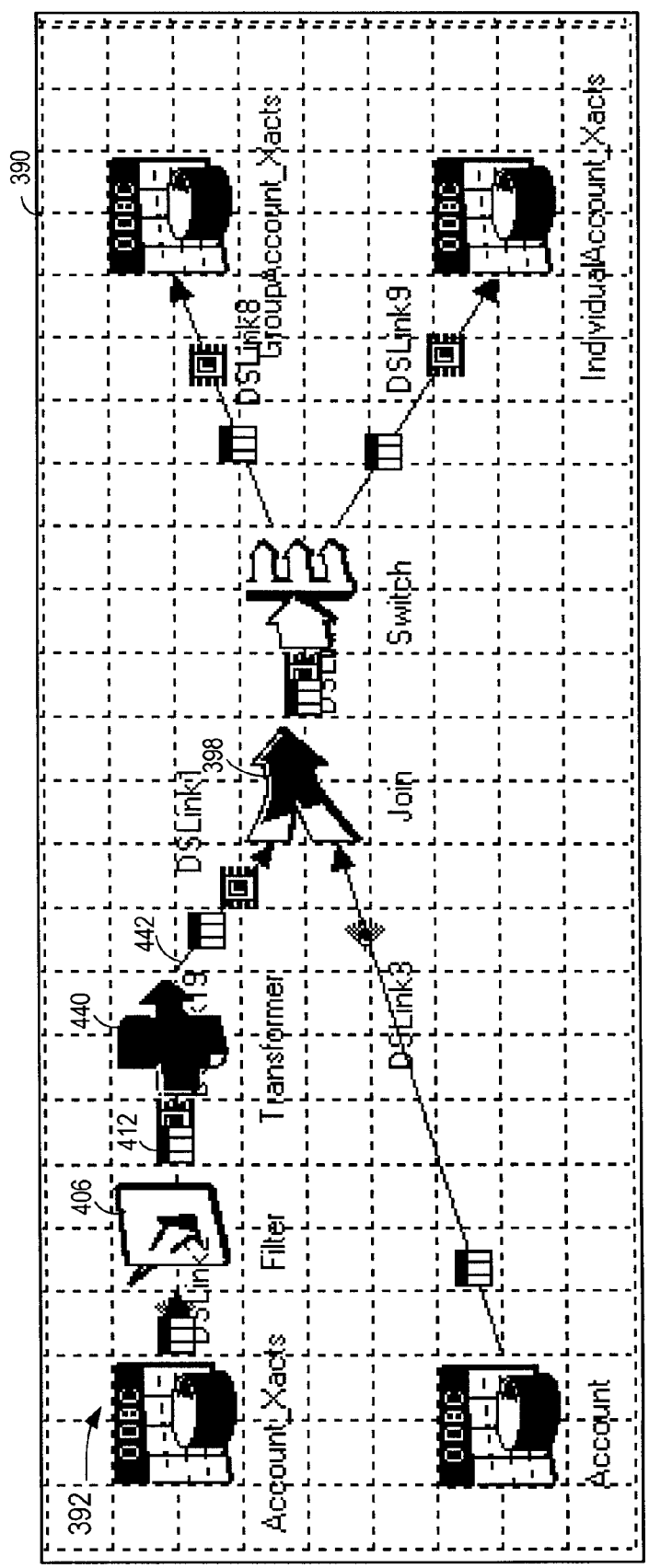
FIG. 20 depicts the exemplary ETL job that is displayed on the canvas of the graphical user interface of FIG. 18 after further processing in accordance with the flowchart of FIG. 16.

FIG. 20 depicts the exemplary ETL job 392 that is displayed on the canvas 390 of the graphical user interface of FIG. 18 after further processing in step 366 of FIG. 16. Rows 4 and 8 of the specification of FIG. 14 refer to the same predefined scalar function (String2Date), and differ in their output, that is, the target column. In response to the requirements of rows 4 and 8 of the specification model of FIG. 15, in accordance with step 424 of FIG. 19, the generation module adds a transformer ETL operator 440 into the ETL job 392 that applies the StringToDate function to rows coming out of the filter ETL operator 406. DSLink19 412 flows from the filter ETL operator 406 to the transformer ETL operator 440. DSLink1 412 flows from the transformer ETL operator 440 to the join ETL operator 398.

Figure 21:
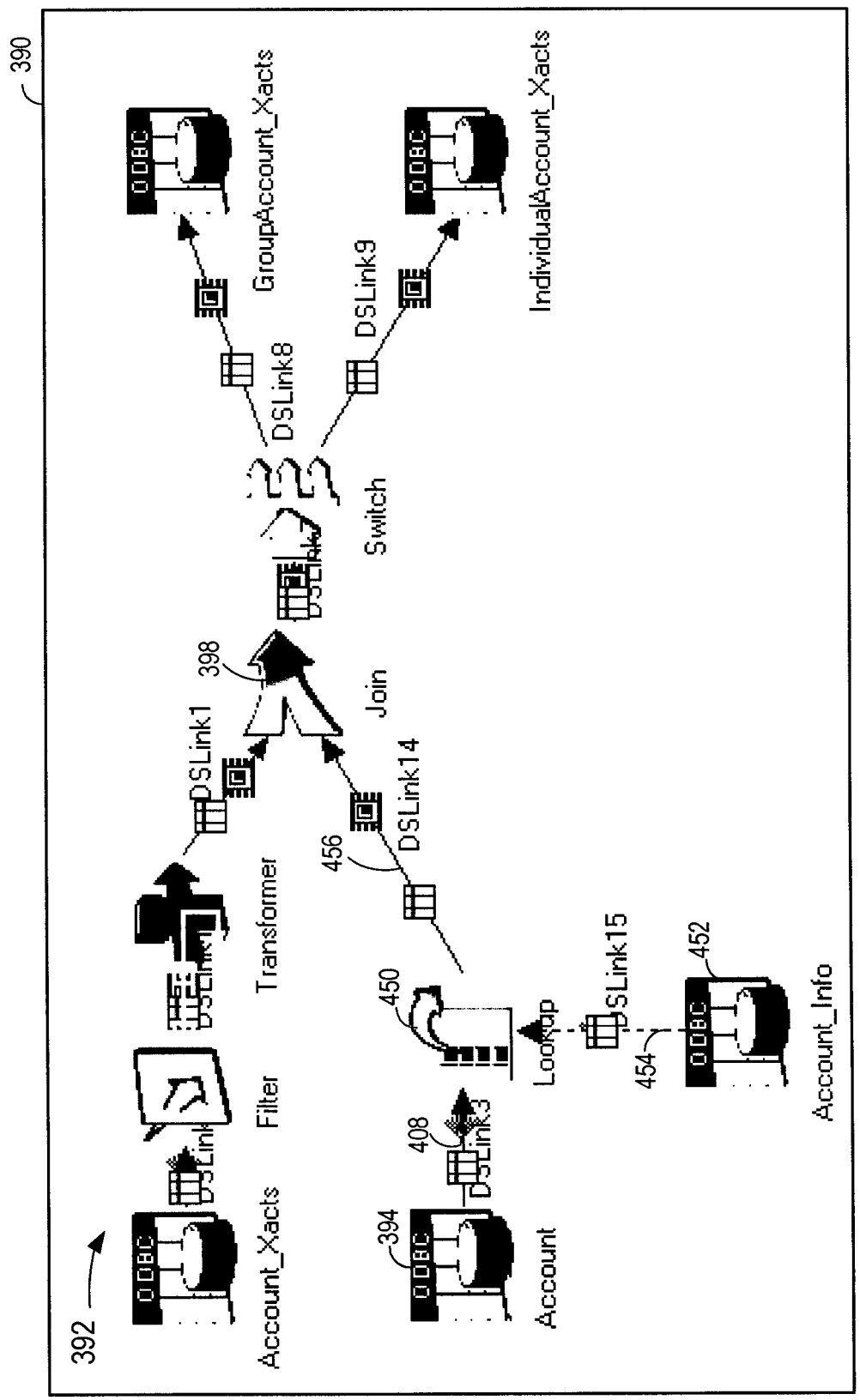
FIG. 21 depicts the exemplary ETL job that is displayed on the canvas of the graphical user interface of FIG. 20 after processing the requirements of the specification model for rows 5 and 9 of the specification of FIG. 14 in accordance with the flowchart of FIG. 16.

FIG. 21 depicts the exemplary ETL job 392 that is displayed on the canvas 390 of a graphical user interface of FIG. 20 after processing the requirements of the specification model for rows 5 and 9 of the specification of FIG. 14 in step 366 of FIG. 16. In FIG. 21, the background grid lines of the canvas are omitted. These requirements refer to a lookup function. While the requirements of rows 5 and 9 map to different columns on the target, these requirements share the same lookup function. Therefore, the requirements are grouped into one lookup operation that maps directly to a lookup ETL operator 450, which is added, that is inserted, into the ETL job 392 with the key condition of Account_Info.Account_Id=Account.Id that relates the Account_Info data asset to the Account data asset. An ODBC data source ETL operator 352 is added to the template to represent the Account_Info source data asset. DSLink3 408 flows from the ODBC data source ETL operator for Account 394 to the lookup ETL operator 450. DSLink15 454 flows from the ODBC data source ETL operator for Account_Info 452 to the lookup operator 450. DSLink14 456 flows from the lookup ETL operator 450 to the join ETL operator 398.

Figure 22:
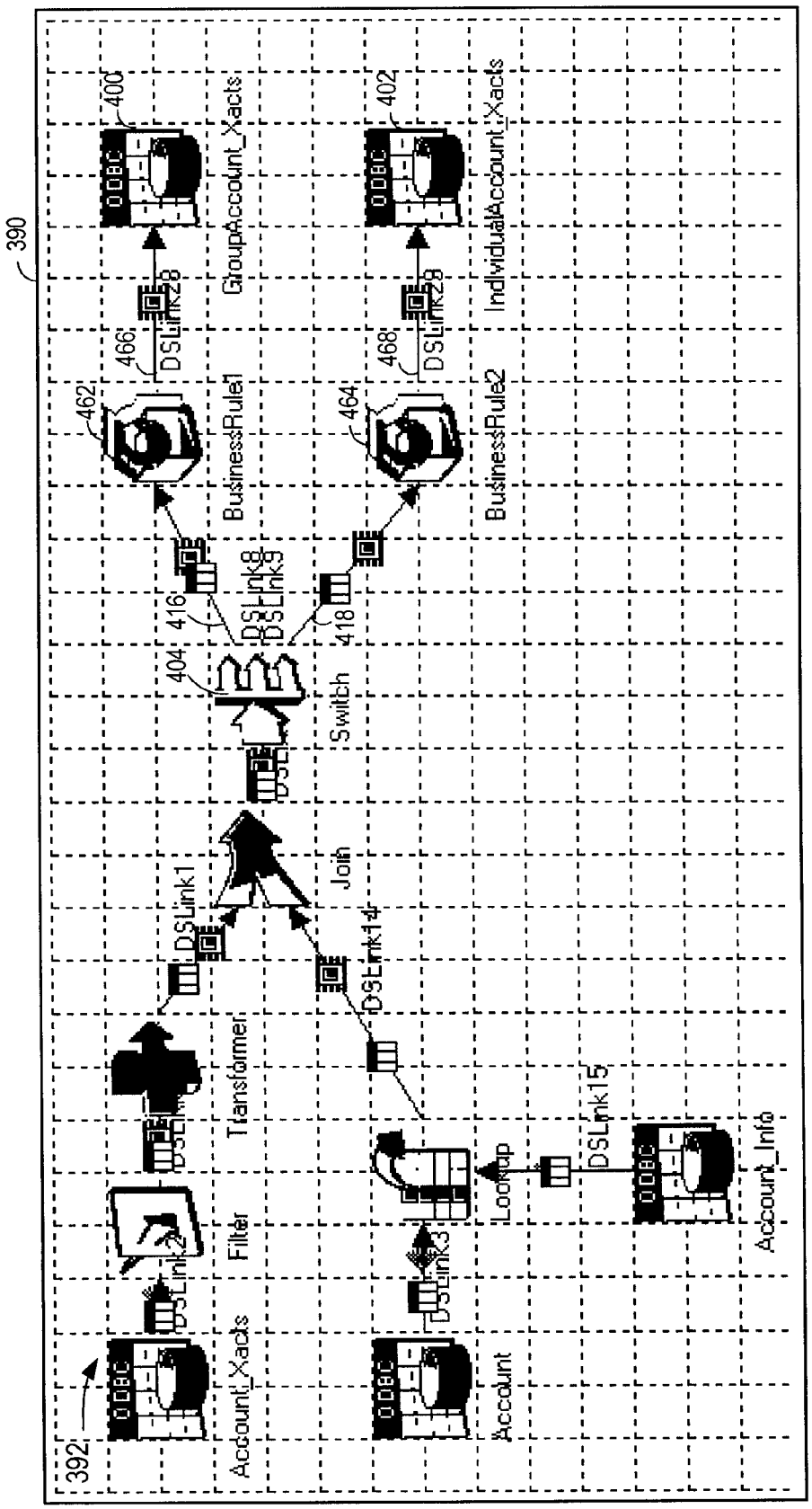
FIG. 22 depicts the exemplary ETL job that is displayed on the canvas of the graphical user interface of FIG. 21 after processing the requirements of the specification model of FIG. 15 for rows 6 and 10 of the specification of FIG. 14 in accordance with the flowcharts of FIG. 16 and FIG. 17.

FIG. 22 depicts the exemplary ETL job 392 that is displayed on the canvas 390 of the graphical user interface of FIG. 21 after processing the requirements of the specification model of FIG. 15 for rows 6 and 10 of the specification of FIG. 14 in step 366 of FIG. 16 and step 432 of FIG. 17. The requirements of rows 6 and 10 are business rules with a textual description. Because the requirement comprises only a textual description, both requirements are resolved to business rule ETL operators 462 and 464, which are interface ETL operators that define the input and output data, but leave the implementation to the developer by following the guidance that is provided by the textual description which is embedded in the business rule ETL operator. The generation module inserts each business rule ETL operator into the template based on is its input and output dependencies. For example, even though the source columns referenced in the requirements are from the same data asset (Account_Xact), they are applied to two different targets. Although the text of the business rules is the same, it is unknown as to whether the logic of the program that will be written by the developer will be the same. Therefore, the requirement of the specification model for row 6 maps to the "BusinessRule1" ETL operator 462 which is inserted after the switch operator 404 and before the target data asset GroupAccount_Xacts 400. The requirement of the specification model for row 10 is resolved to the "BusinessRule2" ETL operator 464 that is inserted after the switch ETL operator 404 and before the target data asset Individual_Accts 402. DSLink8 416 flows from the switch ETL operator 404 to the BusinessRule1 ETL operator 462. DSLink9 418 flows from the switch ETL operator 404 to the BusinessRule2 ETL operator 464. DSLink28 466 flows from BusinessRule1 ETL operator 462 to the ETL operator 400 representing the GroupAccount_Xacts data asset. DSLink29 468 flows from BusinessRule2 ETL operator 464 to the ETL operator 402 representing the IndividualAccount_Xacts data asset.

Figure 23:
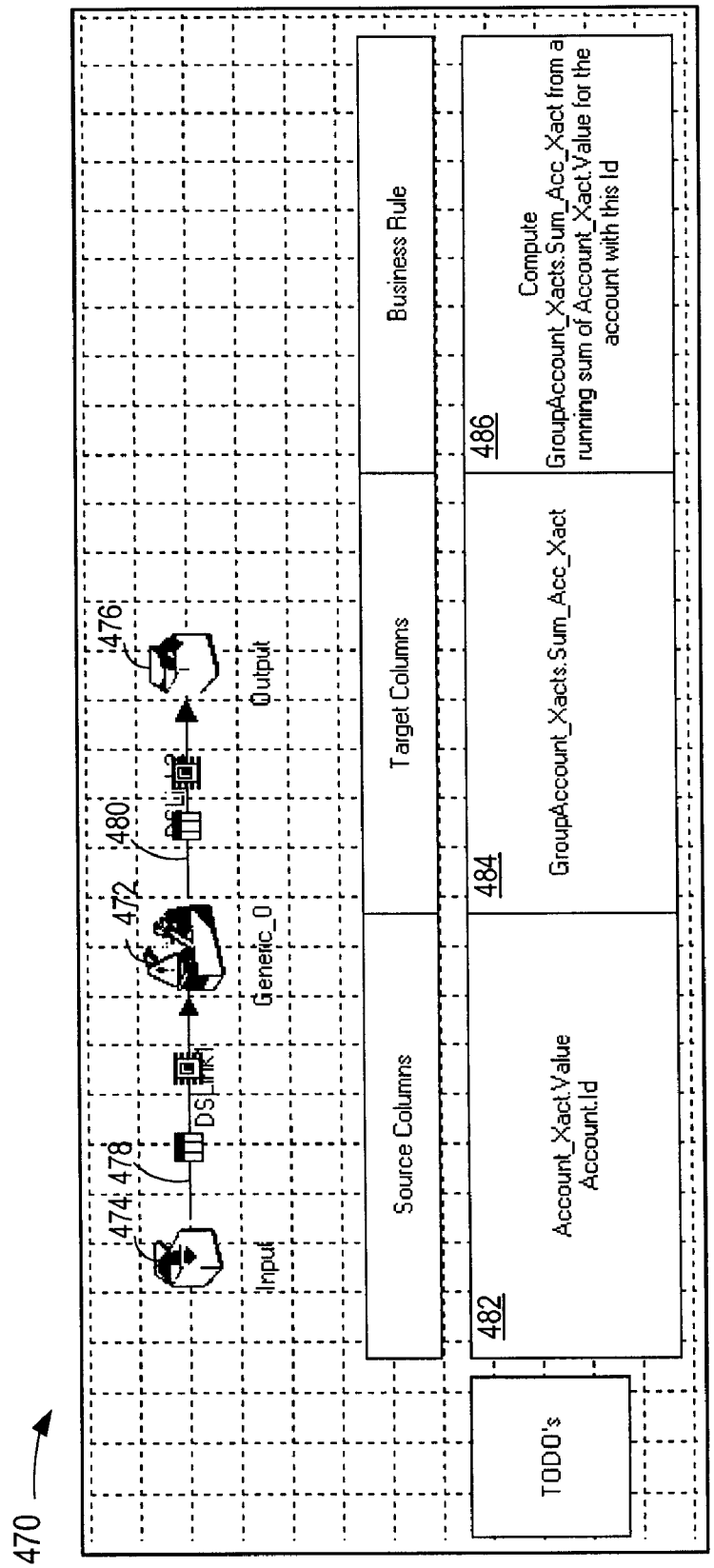
FIG. 23 illustrates a graphical user interface which displays details of a business rule operator.

FIG. 23 illustrates a graphical user interface 470 which displays details of a business rule ETL operator. A generic ETL operator 472 that is nested within the business rule ETL operator is linked to the input 474 and output 476 that is derived from the specification model, and is annotated with the business rule from the specification. The developer can replace the generic ETL operator 472 with the appropriate ETL operators and functions to implement the business rule. In this example, the business rule describes an aggregation, that is, a sum. DSLink1 478 flows from input 474 to the generic ETL operator 472. DSLink2 480 flows from generic ETL operator 472 to output 476. FIG. 23 also presents the source column(s) 482, target column(s) 484 and text of the business rule 486. Thus, a specified business rule can be used as part of the collaborative effect to pass information directly from the business analyst to the developer.

Various embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, various embodiments of the invention can take the form of a computer program product accessible from a computer usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital video disk (DVD).

Figure 24:
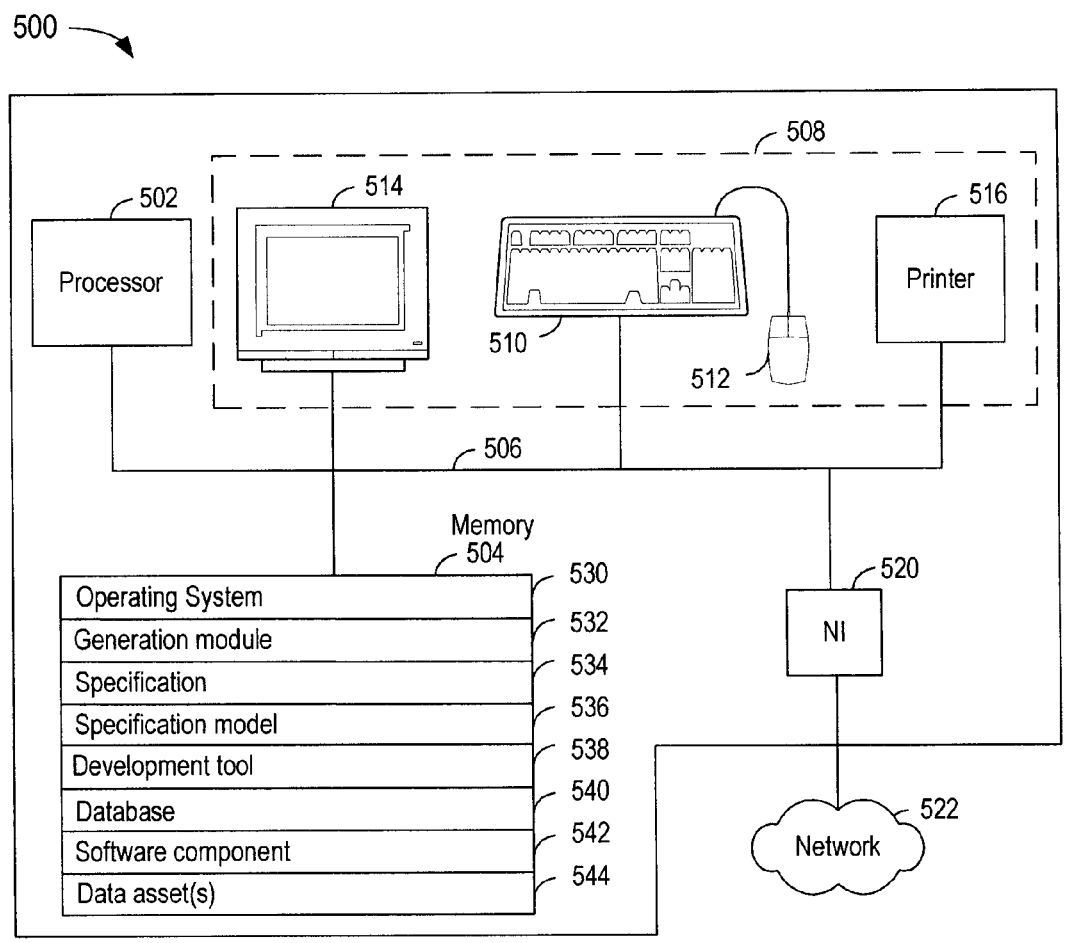
FIG. 24 depicts an illustrative data processing system which uses various embodiments of the present invention.

FIG. 24 depicts an illustrative data processing system 500 which uses various embodiments of the present invention. The data processing system 500 suitable for storing and/or executing program code will include at least one processor 502 coupled directly or indirectly to memory elements 504 through a system bus 506. The memory elements 504 can include local memory employed during actual execution of the program code, bulk storage, and cache memories which provide temporary storage of at least some program code in order to reduce the number of times code must be retrieved from bulk storage during execution.

Input/output or I/O devices 508 (including but not limited to, for example, a keyboard 510, pointing device such as a mouse 512, a display 514, printer 516, etc.) can be coupled to the system bus 506 either directly or through intervening I/O controllers.

Network adapters, such as a network interface (NI) 520, may also be coupled to the system bus 506 to enable the data processing system to become coupled to other data processing systems or remote printers or storage devices through intervening private or public networks 522. Modems, cable modem and Ethernet cards are just a few of the currently available types of network adapters. The network adapter may be coupled to the network via a network transmission line, for example twisted pair, coaxial cable or fiber optic cable, or a wireless interface that uses a wireless transmission medium. In addition, the software in which various embodiments are implemented may be accessible through the transmission medium, for example, from a server over the network.

The memory elements 504 store an operating system 530, generation (Generation) component 532, specification (Specification) 534, specification model 536, Development Tool 538, a Database 540, a software component 542, and data asset(s) 544.

In various embodiments, the Development tool 538 is a graphical development tool to be used by a developer. In some embodiments, the Development tool 58 is IBM WebSphere DataStage.

In various embodiments, the Database 540 may be a relational, hierarchical or network database management system and the associated data of the database. For example, the Database 540 is a relational database management system with one or more tables.

The operating system 530 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems, Inc.) and HP-UX® (Registered trademark of Hewlett-Packard Development Company, L.P.).

The exemplary data processing system 500 that is illustrated in FIG. 24 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method comprising:
providing a specification describing a business process, said specification comprising at least one input, at least one output, and at least one requirement referencing said at least one input and said at least one output;
generating a specification model based on said specification, wherein said specification model incorporates said at least one input, said at least one output, and said at least one requirement;
constructing a control flow of a software component based on said specification model, wherein constructing said control flow comprises:
(i) inserting a call to a programming routine into said control flow for each of said at least one requirement of said specification model; and
(ii) generating a template representing said control flow, wherein said template comprises at least one software sub-component representing said at least one input and at least one software sub-component representing said at least one output; and
generating at least one partial implementation of said software component based on said control flow and said specification model, wherein generating said at least one partial implementation comprises generating a programming routine for each of said at least one requirement of said specification model, wherein a generation module is configured to interpret programming logic specifying an actual programming expression to be used to compute said at least one output and is further configured to interpret a business rule having a textual description, wherein said at least one requirement comprises a plurality of requirements, and wherein generating said at least one partial implementation further comprises, inserting an interface software sub-component into said template upon determining that one of said plurality of requirements is a business rule.

2. The method of claim 1, wherein said specification is associated with a business analyst, and wherein said at least one partial implementation is associated with a developer to provide a collaborative environment between said business analyst and said developer.

3. The method of claim 1, wherein said at least one requirement comprises a plurality of requirements, and wherein constructing said control flow further comprises ordering said plurality of requirements into a logical sequence.

4. The method of claim 3, further comprising determining whether there is an implicit dependency between at least two of said plurality of requirements, wherein said plurality of requirements are ordered based on said implicit dependency.

5. The method of claim 1, wherein said at least one requirement comprises a business rule having a textual description, and wherein generating said at least one partial implementation further comprises including said textual description in a programming routine for said business rule.

6. The method of claim 1, wherein said at least one requirement comprises programming logic, and wherein generating said at least said partial implementation further comprises including said programming logic in a programming routine for said programming logic.

7. The method of claim 1, wherein said at least one requirement comprises a plurality of requirements, and wherein said generating said at least one partial implementation further comprises inserting a software sub-component representing at least one of said plurality of requirements into said template.

8. The method of claim 1, further comprising displaying said template on a graphical interface.

9. The method of claim 1, wherein said at least one requirement comprises a plurality of requirements, and wherein constructing said control flow further comprises inserting a software sub-component into said template in response to one of said plurality of requirements having a plurality of inputs and one output.

10. The method of claim 1 wherein constructing said control flow further comprises inserting a software sub-component into said template in response to one of said plurality of requirements having a single input and a plurality of outputs.

11. The method of claim 1, wherein said at least one requirement comprises a plurality of requirements, wherein said at least one input comprises a plurality of source data assets, wherein said at least one output comprises a plurality of target data assets, and wherein constructing said control flow further comprises:
traversing said specification model to identify said source data assets and adding software sub-components respectively representing said source data assets to said template;
determining whether said source data assets are related;
upon determining that said source data assets have a relationship, inserting a first software sub-component representing said relationship into said template; and
identifying any data asset level requirements and respectively adding associated software sub-components to said template.

12. The method of claim 1, wherein said software component is an Extract, Transform and Load job.

13. The method of claim 1, wherein said software component is a Java class.

14. The method of claim 1, wherein said software component comprises a linkage between Web Services.

15. A computer program product comprising a non-transitory computer usable medium having computer usable program code for providing an implementation of software, said computer program product including:

computer usable program code for providing a specification describing a business process, said specification comprising at least one input, at least one output, and at least one requirement referencing said at least one input and said at least one output;

computer usable program code for generating a specification model based on said specification, wherein said specification model incorporates said at least one input, said at least one output, and said at least one requirement;

computer usable program code for constructing a control flow of a software component based on said specification model, wherein constructing said control flow comprises:
  (i) inserting a call to a programming routine into said control flow for each of said at least one requirement of said specification model; and
  (ii) generating a template representing said control flow, wherein said template comprises at least one software sub-component representing said at least one input and at least one software sub-component representing said at least one output; and computer usable program code for generating at least one partial implementation of said software component based on said control flow and said specification model, wherein generating said at least one partial implementation comprises generating a programming routine for each of said at least one requirement of said specification model, and wherein a generation module is configured to interpret programming logic specifying an actual programming expression to be used to compute said at least one output and is further configured to interpret a business rule having a textual description, wherein said at least one requirement comprises a plurality of requirements, and wherein generating said at least one partial implementation further comprises, inserting an interface software sub-component into said template upon determining that one of said plurality of requirements is a business rule.

16. The computer program product of claim 15, wherein said at least one requirement comprises a business rule having a textual description, and wherein said computer usable program code for generating said at least one partial implementation comprises computer usable program code for including said textual description in a programming routine for said business rule.

17. The computer program product of claim 15, wherein said at least one requirement comprises a plurality of requirements, wherein said at least one input comprises a plurality of source data assets, said at least one output comprises a plurality of target data assets, and wherein said computer usable program code for constructing said control flow comprises:

computer usable program code for traversing said specification model to identify said source data assets and for adding software sub-components respectively representing said source data assets to said template;

computer usable program code for determining whether said source data assets are related;

computer usable program code for, upon determining that said source data assets have a relationship, inserting a first software sub-component representing said relationship into said template; and computer usable program code for identifying any data asset level requirements, and for respectively adding associated software sub-components to said template.

18. A data processing system comprising:
a processor; and
a memory storing instructions to be executed by said processor, said memory storing instructions for:
providing a specification describing a business process, said specification comprising at least one input, at least one output, and at least one requirement referencing said at least one input and said at least one output;

generating a specification model based on said specification, wherein said specification model incorporates said at least one input, said at least one output, and said at least one requirement;

constructing a control flow of a software component based on said specification model, wherein constructing said control flow comprises:
  (i) inserting a call to a programming routine into said control flow for each of said at least one requirement of said specification model; and
  (ii) generating a template representing said control flow, wherein said template comprises at least one software sub-component representing said at least one input and at least one software sub-component representing said at least one output; and generating at least one partial implementation of said software component based on said control flow and said specification model wherein generating said at least one partial implementation comprises generating a programming routine for each of said at least one requirement of said specification model, and wherein a generation module is configured to interpret programming logic specifying an actual programming expression to be used to compute said at least one output and is further configured to interpret a business rule having a textual description, wherein said at least one requirement comprises a plurality of requirements, and wherein generating said at least one partial implementation further comprises, inserting an interface software sub-component into said template upon determining that one of said plurality of requirements is a business rule.

19. The data processing system of claim 18, wherein said at least one requirement comprises a plurality of requirements, and wherein said instructions for generating said at least one partial implementation insert an interface software sub-component into said template upon determining that one of said plurality of requirements is a business rule.

* * * * *